(12) United States Patent
Borade et al.

(10) Patent No.: US 7,812,077 B2
(45) Date of Patent: Oct. 12, 2010

(54) POLYESTER COMPOSITIONS, METHOD OF MANUFACTURE, AND USES THEREOF

(75) Inventors: Pravin Kamlakar Borade, Maharashtra (IN); Robert Russell Gallucci, Mt. Vernon, IN (US); Rama Konduri, Evansville, IN (US); Johannes Hubertus G. M. Lohmeijer, Lorentzstraat (NL); Subodh Kumar Pal, Karnataka (IN); Veeraraghavan Srinivasan, Karnataka (IN); Chris van der Weele, Sommelskijk (NL); Gerrit de Wit, Ossendrecht (NL)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 11/870,883

(22) Filed: Oct. 11, 2007

(65) Prior Publication Data

US 2008/0139711 A1 Jun. 12, 2008

Related U.S. Application Data

(63) Continuation-in-part of application No. 11/012,800, filed on Dec. 15, 2004.

(60) Provisional application No. 60/942,823, filed on Jun. 8, 2007, provisional application No. 60/530,147, filed on Dec. 17, 2003.

(51) Int. Cl.
*C08K 5/34* (2006.01)
*C08K 5/49* (2006.01)
*C07F 9/48* (2006.01)
*C08G 63/60* (2006.01)

(52) U.S. Cl. .............. 524/126; 524/100; 524/121; 524/605

(58) Field of Classification Search .............. 524/100, 524/126, 133, 135, 121, 605; 252/609
See application file for complete search history.

(56) References Cited

U.S. PATENT DOCUMENTS

| | | | |
|---|---|---|---|
| 2,465,319 A | 3/1949 | Whinfield et al. | |
| 3,047,539 A | 7/1962 | Pengilly | |
| 3,671,487 A | 6/1972 | Abolins | |
| 3,907,868 A | 9/1975 | Currie et al. | |
| 3,953,394 A | 4/1976 | Fox et al. | |
| 3,953,404 A | 4/1976 | Borman | |
| 4,096,156 A | 6/1978 | Freudenberger et al. | |
| 4,609,680 A | 9/1986 | Fujita et al. | |
| 4,954,540 A | 9/1990 | Nakane et al. | |
| 4,983,660 A * | 1/1991 | Yoshida et al. | 524/369 |
| 5,266,601 A | 11/1993 | Kyber et al. | |
| 5,385,970 A | 1/1995 | Gallucci et al. | |
| 5,413,681 A | 5/1995 | Tustin et al. | |
| 5,451,611 A | 9/1995 | Chilukuri et al. | |
| 5,559,159 A | 9/1996 | Sublett et al. | |
| 5,684,071 A | 11/1997 | Mogami et al. | |
| 5,955,565 A * | 9/1999 | Morris et al. | 528/271 |
| 6,013,707 A | 1/2000 | Kleiner et al. | |
| 6,068,935 A * | 5/2000 | Hayami et al. | 428/482 |
| 6,111,031 A * | 8/2000 | Puyenbroek et al. | 525/422 |
| 6,162,837 A | 12/2000 | Gerking et al. | |
| 6,166,114 A | 12/2000 | Cosstick et al. | |
| 6,255,371 B1 * | 7/2001 | Schlosser et al. | 524/100 |
| 6,420,459 B1 | 7/2002 | Horold | |
| 6,429,243 B1 * | 8/2002 | Okamoto et al. | 524/127 |
| 6,503,988 B1 * | 1/2003 | Kitahara et al. | 525/326.2 |
| 6,518,322 B1 | 2/2003 | West | |
| 6,531,530 B2 | 3/2003 | Asano | |
| 6,547,992 B1 * | 4/2003 | Schlosser et al. | 252/609 |
| 6,887,909 B2 | 5/2005 | Kawamura et al. | |
| 6,927,275 B2 | 8/2005 | Hirokane et al. | |
| 7,105,589 B2 | 9/2006 | Geprags | |
| 7,183,362 B2 | 2/2007 | Hirokane et al. | |

(Continued)

FOREIGN PATENT DOCUMENTS

DE  19904814  8/2000

(Continued)

OTHER PUBLICATIONS

Cooper, et al., "Life Cycle Engineering Guidelines," EPA 600/R-01/101, Risk Management Research, pp. 1-100 (2001).

(Continued)

*Primary Examiner*—Vasu Jagannathan
*Assistant Examiner*—Alexander C Kollias
(74) *Attorney, Agent, or Firm*—Cantor Colburn LLP; Diderico van Eyl

(57) ABSTRACT

A composition comprises 20 to 80 wt. % of a polyester component comprising a modified polybutylene terephthalate random copolymer derived from a polyethylene terephthalate component selected from polyethylene terephthalate and polyethylene terephthalate copolymers and having at least one residue derived from the polyethylene terephthalate component; from 5 to 35 wt. % of a flame retardant phosphinate (I) or (II)

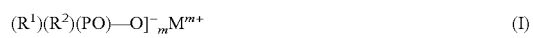

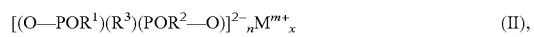

and/or a flame retardant polymer thereof, wherein $R^1$ and $R^2$ are independently are H, C1-C6-alkyl, or C6-C10-aryl; $R^3$ is C1-C10, alkylene, C6-C10-arylene, -alkylarylene or -arylalkylene; M is an alkaline earth metal, alkali metal, Al, Ti, Zn, Fe, or boron; m is 1, 2, 3 or 4; n is 1, 2, or 3; and x is 1 or 2; 1 to 25 wt. % of a melamine polyphosphate, melamine cyanurate, melamine pyrophosphate, and/or melamine phosphate; and more than 0 to 25 wt. % of a polyetherimide.

50 Claims, No Drawings

U.S. PATENT DOCUMENTS

| | | | |
|---|---|---|---|
| 7,388,067 | B2 | 6/2008 | Leemans et al. |
| 7,462,649 | B2 | 12/2008 | Nakao et al. |
| 2001/0007888 | A1 | 7/2001 | Asano |
| 2001/0009944 | A1 | 7/2001 | Chisolm et al. |
| 2002/0123566 | A1* | 9/2002 | Georgiev et al. .............. 525/66 |
| 2003/0018107 | A1 | 1/2003 | Heinen et al. |
| 2005/0137300 | A1 | 6/2005 | Schlosser et al. |
| 2005/0143503 | A1 | 6/2005 | Bauer et al. |
| 2005/0154099 | A1 | 7/2005 | Kobayashi et al. |
| 2005/0272839 | A1 | 12/2005 | Bauer et al. |
| 2006/0058431 | A1 | 3/2006 | Cartier et al. |
| 2006/0084734 | A1 | 4/2006 | Bauer et al. |
| 2006/0247339 | A1 | 11/2006 | Harashina et al. |
| 2007/0275242 | A1 | 11/2007 | Gopal et al. |
| 2008/0139711 | A1 | 6/2008 | Borade et al. |
| 2009/0124733 | A1 | 5/2009 | Haruhara et al. |

FOREIGN PATENT DOCUMENTS

| | | | |
|---|---|---|---|
| EP | 0400935 | A2 | 12/1990 |
| EP | 0919591 | | 6/1999 |
| EP | 1024168 | | 8/2000 |
| EP | 1070754 | | 1/2001 |
| EP | 1967549 | A1 | 9/2008 |
| GB | 1500577 | | 2/1978 |
| WO | 9902606 | | 1/1999 |
| WO | WO9965987 | * | 12/1999 |
| WO | 00/49077 | | 8/2000 |
| WO | WO0121698 | * | 3/2001 |
| WO | 2005059018 | | 6/2005 |

OTHER PUBLICATIONS

ASTM Designation: D 256-06, "Standard Test Methods for Determining the Izod Pendulum Impact Resistance of Plastics," pp. 1-20 (2006).

ASTM Designation: D 648-06, "Standard Test Method for Deflection Temperature of Plastics Under Flexural Load in the Edgewise Position," pp. 1-13 (2006).

International Standard: ISO 180, "Plastics—Determination of Izod Impact Strength," pp. 1-16 (2000).

International Standard: ISO 527-1, "Plastics—Determination of Tensile Properties," pp. 1-54 (1993).

UL 94, "Tests for Flammability of Plastic Materials for Parts in Devices and Appliances," 52 pgs., (Dec. 12, 2003).

S.H. Mansour et al., "Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.

International Seach Report & Written Opinion, International Application No. PCT/US2008/066599, International Filing Date Jun. 11, 2008, mailed Mar. 2, 2009, 12 pages.

International Search Report & Written Opinon, International Application No. PCT/US2008/066603, International Filing Date Jun. 11, 2008, Date of Mailing Mar. 12, 2009; 13 pages.

International Search Report & Written Opinion, International Application No. PCT/US2004/042202; International Filing Date Dec. 16, 2004; Date of Mailing Mar. 9, 2005; 12 pages.

International Preliminary Report on Patentability & Written Opinion, International Application No. PCT/US2004/042202; International Filing Date Dec. 16, 2004; Date of Mailing Jun. 20, 2006; 5 pages.

* cited by examiner

POLYESTER COMPOSITIONS, METHOD OF MANUFACTURE, AND USES THEREOF

CROSS REFERENCE TO RELATED APPLICATIONS

This application claims priority to U.S. Provisional Application No. 60/942,823 filed Jun. 8, 2007; this application is also a continuation-in-part of U.S. application Ser. No. 11/012,800, filed on Dec. 15, 2004, which claims priority to U.S. Provisional Application No. 60/530,147 filed on Dec. 17, 2003, all of which are incorporated herein by reference in their entirety.

BACKGROUND

Thermoplastic polyester compositions, such as poly(alkylene terephthalates), have valuable characteristics including strength, toughness, high gloss, and solvent resistance. Polyesters therefore have utility as materials for a wide range of applications, from automotive parts to electric and electronic appliances. Because of their wide use, particularly in electronic applications, it is desirable to provide flame retardancy to polyesters. One set of test conditions commonly accepted and used as a standard for flame retardancy is set forth in Underwriters Laboratories, Inc. Bulletin 94, which prescribes certain conditions by which materials are rated for self-extinguishing characteristics. Another set of conditions commonly accepted and used (especially in Europe) as a standard for flame retardancy is the Glow Wire Ignition Test (GWIT), performed according to the International standard IEC 695-2-1/2.

Numerous flame retardants for polyesters are known, but many contain halogens, usually chlorine and/or bromine. Halogenated flame retardant agents are less desirable because of the increasing demand for ecologically friendly ingredients. Halogen-free flame retardants, such as phosphorus- and nitrogen-based compounds can be used as well. Unfortunately, they lack good flame retardancy in thin sections.

There is a need for polyester compositions having the combination of good flame retardant properties not only at thicknesses of 1.5 mm or greater, but also at thicknesses of 0.8 mm or less. It would be advantageous if this combination of flame retardant properties could be achieved while at least essentially maintaining mechanical properties and/or heat properties.

SUMMARY

One or more of the above described drawbacks and disadvantages can be alleviated or minimized by a composition comprising: (a) from 20 to 80 wt. % of a polyester; (b) from 5 to 35 wt. % of a flame retardant phosphinate of the formula (I)

a flame retardant diphosphinate of the formula (II),

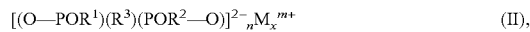

and/or a flame retardant polymer derived from the flame retardant phosphinate of the formula (I) or the flame retardant diphosphinate of the formula (II), wherein $R^1$ and $R^2$ are identical or different and are H, $C_1$-$C_6$-alkyl, linear or branched, or $C_6$-$C_{10}$-aryl; $R^3$ is $C_1$-$C_{10}$-alkylene, linear or branched, $C_6$-$C_{10}$-arylene, -alkylarylene or -arylalkylene; M is an alkaline earth metal, alkali metal, Al, Ti, Zn, Fe, or boron; m is 1, 2, 3 or 4; n is 1, 2, or 3; and x is 1 or 2; (c) from 1 to 25 wt. % of a melamine polyphosphate, melamine cyanurate, melamine pyrophosphate, and/or melamine phosphate; (d) from more than 0 to 25 wt. % of a polyetherimide; and (e) optionally, and additive.

In another embodiment, a method for the manufacture of a composition comprises blending the components of the above-described composition.

Also described is an article comprising the above-described composition/

A method of forming an article comprises shaping, extruding, calendaring, or molding the above-described composition to form the article.

In still another embodiment, a composition consists essentially of, based on the total weight of the composition: from 35 to 65 wt. % of a poly(1,4-butylene terephthalate); from 5 to 25 wt. % of a flame retardant phosphinate of the formula (Ia)

a flame retardant diphosphinate of the formula (IIa)

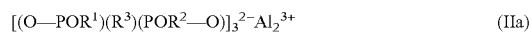

and/or a flame retardant polymer derived from formula (Ia) or (IIa), wherein $R^1$ and $R^2$ are identical or different and are H, $C_1$-$C_6$-alkyl, linear or branched, or $C_6$-$C_{10}$-aryl; $R^3$ is $C_1$-$C_{10}$-alkylene, linear or branched, $C_6$-$C_{10}$-arylene, -alkylarylene or -arylalkylene; from 1 to 25 wt. % of melamine polyphosphate and/or melamine cyanurate; from 0.1 to 25 wt. % of an aromatic polyetherimide; and from 15 to 45 wt. % of a reinforcing filler, wherein a molded sample comprising the composition has a tensile strength at yield from 90 to 120 MPa measured in accordance with ISO 527, and an unnotched Izod impact strength from to 25 to 50 KJ/m² measured at 23° C. in accordance with ISO 180, and a 0.8 mm thick molded sample comprising the composition has a UL-94 flammability rating of V0.

In still another embodiment, a composition consists essentially of, based on the total weight of the composition: from 40 to 65 wt. % of a poly(1,4-butylene terephthalate) having a weight average molecular weight of 45,000 a.m.u. or greater, as determined by gel permeation chromatography with a polystyrene standard; from 7 to 20 wt. % of a flame retardant phosphinate of the formula (Ia)

a flame retardant diphosphinate of the formula (IIa)

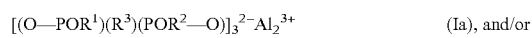

a flame retardant polymer comprising formula (Ia) or (IIa), wherein $R^1$ and $R^2$ are identical or different and are H, $C_1$-$C_6$-alkyl, linear or branched, or $C_6$-$C_{10}$-aryl; $R^3$ is $C_1$-$C_{10}$-alkylene, linear or branched, $C_6$-$C_{10}$-arylene, -alkylarylene or -arylalkylene; from 2 to 8 wt. % of melamine polyphosphate and/or melamine cyanurate; from 2 to 8 wt. % of an aromatic polyetherimide; and from 20 to 35 wt. % of a reinforcing filler.

DETAILED DESCRIPTION OF THE PREFERRED EMBODIMENTS

According to an embodiment, a composition comprises a polyester such as a poly(butylene terephthalate); a nitrogen-containing flame retardant selected from the group consisting of at least one of a triazine, a guanidine, a cyanurate, an isocyanurate, and mixtures thereof, a phosphinic acid salt of formula I and/or diphosphinic acid salt of formula II and/or their polymers as described below; and a charring polymer.

In another embodiment, it has been found that use of a polyester component in combination with a specific amount of a metal phosphinate salt, a particular nitrogen-containing flame retardant (melamine polyphosphate, melamine cyanurate, melamine pyrophosphate, and/or melamine phosphate) and up to 25 wt. % of a polyetherimide, provides compositions that have excellent flame retardancy for both thick and thin articles. The flame retardancy can be obtained in the absence of a halogenated organic flame retardant. The compositions can further have very useful mechanical properties, in particular impact strength, tensile properties, and/or heat stability.

In a particularly advantageous feature, the polyester component comprises a modified poly(butylene terephthalate) component derived from poly(ethylene terephthalate) (PET), for example used PET soft drink bottles. Unlike conventional molding compositions containing virgin PBT (PBT that is derived from monomers), the modified PBT component contains a polyethylene terephthalate residue, e.g., a material such as ethylene glycol and isophthalic acid groups (components that are not present in virgin, monomer-based PBT). Advantageously, despite using a PBT that is structurally different from virgin PBT, the compositions and articles made from the composition described herein exhibit similar performance properties as compositions and articles made from molding compositions containing monomer-based PBT. Use of modified PBT can provide a valuable way to effectively use underutilized scrap PET (from post-consumer or post-industrial streams) in PBT thermoplastic molding compositions, thereby conserving non-renewable resources and reducing the formation of greenhouse gases, e.g., $CO_2$. Surprisingly, molding compositions containing modified-PBT random copolymers derived from polyethylene terephthalate can exhibit improved flow properties, as compared to molding compositions containing PBT derived from monomers.

As used herein the singular forms "a," "an," and "the" include plural referents. the term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 1991 edition of the Annual Book of ASTM Standards unless otherwise indicated. All cited references are incorporated herein by reference.

For the sake of clarity, the terms terephthalic acid group, isophthalic acid group, butanediol group, ethylene glycol group in formulas have the following meanings. The term "terephthalic acid group" in a composition refers to a divalent 1,4-benzene radical $(1,4-(C_6H_4)-)$ remaining after removal of the carboxylic groups from terephthalic acid-. The term "isophthalic acid group" refers to a divalent 1,3-benzene radical $(-(-1,3-C_6H_4)-)$ remaining after removal of the carboxylic groups from isophthalic acid. The "butanediol group" refers to a divalent butylene radical $(-(C_4H_8)-)$ remaining after removal of hydroxyl groups from butanediol. The term "ethylene glycol group" refers to a divalent ethylene radical $(-(C_2H_4)-)$ remaining after removal of hydroxyl groups from ethylene glycol. With respect to the terms "terephthalic acid group," "isophthalic acid group," "ethylene glycol group," "butane-diol group," and "diethylene glycol group" being used in other contexts, e.g., to indicate the weight % of the group in a composition, the term "isophthalic acid group(s)" means the group having the formula $(-O(CO)C_6H_4(CO)-)$, the term "terephthalic acid group(s)" means the group having the formula $(-O(CO)C_6H_4(CO)-)$, the term diethylene glycol group means the group having $(-O(C_2H_4)O(C_2H_4)-)$, the term "butanediol group(s)" means the group having the formula $(-O(C_4H_8)-)$, and the term "ethylene glycol groups(s)" means the group having formula $(-O(C_2H_4)-)$.

The residue derived from the polyethylene terephthalate component, which is present in the modified polybutylene terephthalate component can be selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the trans isomer of 1,3-cyclohexane dimethanol, the -trans isomer of 1,4-cyclohexane dimethanol, alkali salts, alkaline earth metal salts, including calcium, magnesium, sodium and potassium salts, phosphorous-containing compounds and anions, sulfur-containing compounds and anions, naphthalene dicarboxylic acids, 1,3-propanediol groups, and combinations thereof.

Depending on factors such as polyethylene terephthalate and polyethylene terephthalate copolymers, the residue can include various combinations. In one embodiment, for instance, the residue includes mixtures of ethylene glycol and diethylene glycol. In another embodiment, the residue includes mixtures of ethylene glycol and diethylene glycol and isophthalic acid. In another embodiment, the residue derived from polyethylene terephthalate further includes cis isomer of 1,3-cyclohexane dimethanol, 1,4-cyclohexane dimethanol, trans isomer of 1,3-cyclohexane dimethanol, trans isomer of 1,4-cyclohexane dimethanol and combinations thereof. In another embodiment, the residue includes cis isomer of 1,3-cyclohexane dimethanol, 1,4-cyclohexane dimethanol, trans isomer of 1,3-cyclohexane dimethanol, trans isomer of 1,4-cyclohexane dimethanol, and combinations thereof. And in another embodiment, the residue can be a mixture of ethylene glycol, diethylene glycol, isophthalic acid groups, cis isomer of cyclohexane dimethanol, trans isomer of cyclohexane dimethanol, and combinations thereof. In one embodiment, the residue derived from polyethylene terephthalate includes mixtures of ethylene glycol, diethylene glycol, and cobalt-containing compounds. Such cobalt-containing compound mixture can also contain isophthalic acid groups.

The amount of the ethylene glycol groups, diethylene glycol groups, and the isophthalic acid groups in the polymeric backbone of the modified PBT component can vary. The PET-derived modified PBT component ordinarily contains isophthalic acid groups in an amount that is at least 0.1 mole % and can range from 0 or 0.1 to 10 mole % (0 or 0.07 to 7 wt. %). The PET-derived modified PBT component ordinarily contains ethylene glycol in an amount that is at least 0.1 mole % and can range from 0.1 to 10 mole % (0.02 to 2 wt. %). In one embodiment, the PET-derived modified PBT component has an ethylene glycol content that is more than 0.85 wt. %. In another embodiment, compositions can contain ethylene glycol is present in an amount from 0.1 wt. % to 2 wt. %. The modified PBT component can also contain diethylene glycol in an amount from 0.1 to 10 mole % (0.04 to 4 wt. %). The amount of the butanediol groups is generally about 98 mole % and can vary from 95 to 99.8 mole % in some embodiments. The amount of the terephthalic acid groups is generally about 98 mole % and can vary from 90 to 99.9 mole % in some embodiments.

Unless otherwise specified, all molar amounts of the isophthalic acid groups and or terephthalic acid groups are based on the total moles of diacids/diesters in the composition. Unless otherwise specified, all molar amounts of the butane diol, ethylene glycol, and diethylene glycol groups are based on the total moles of diol in the composition. The weight percent measurements stated above are based on the way terephthalic acid groups, isophthalic acid groups, ethylene glycol groups, and diethylene glycol groups have been defined herein.

The total amount of materials of the polyethylene terephthalate component residue in the modified polybutylene terephthalate random copolymer can vary. For instance, mixtures can be in an amount from 1.8 to 2.5 wt. %, or from 0.5 to 2 wt. %, or from 1 to 4 wt. %. The ethylene glycol, diethylene glycol, and cyclohexanedimethanol groups can be individually or in combination present in an amount from 0.1 to 10 mole %, based on 100 mole % of glycol of the molding composition. The isophthalic acid groups can be present in an amount from 0.1 to 10 mole %, based on 100 mole % of diacid/diester in the molding composition.

It has been discovered that when it is desirable to make a polybutylene terephthalate copolymer having a melting Temperature™ that is at least 200° C., the total amount of diethylene glycol, ethylene glycol, and isophthalic acid groups should be within a certain range. As such, in one embodiment, the total amount of the diethylene glycol, ethylene glycol, and isophthalic acid groups in the modified polybutylene terephthalate component is more than 0 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups is from 3 to less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups is from 3 to less than or equal to 10 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups is from 10 to less than or equal to 23 equivalents, relative to the total of 100 equivalents of diol and 100 equivalents of diacid groups in the modified polybutylene terephthalate random copolymer. In one embodiment, diethylene glycol, ethylene glycol, and/or isophthalic acid can be added during the process.

The total ethylene glycol groups, isophthalic acid groups, and diethylene glycol groups can vary, depending on the application needs. In one embodiment, the composition can have total monomer content selected from the group consisting of ethylene glycol, isophthalic acid groups, and diethylene glycol groups in an amount from more than 0 and less than or equal to 17 equivalents relative to the total of 100 equivalents of diol and 100 equivalents of diacid groups in the modified polybutylene terephthalate random copolymer. Advantageously, such compositions can maintain useful properties, such as heat deflection temperatures that are more than 80° C.

It has also been discovered that the total amount of inorganic residues derived from the polyethylene terephthalate can be present from more than 0 ppm and up to 1000 ppm. Examples of such inorganic residues can be selected from the group consisting of antimony-containing compounds, germanium-containing compounds, titanium-containing compounds, cobalt-containing compounds, tin containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof. In another embodiment, the amounts of inorganic residues can be from 250 to 1000 ppm. In another embodiment, the amounts of inorganic residues can be from 500 to 1000 ppm.

The PET component from which the modified polybutylene terephthalate random copolymer is made can be in a variety of forms. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid, and other contaminants. Also, the PET component can include PET that is not waste in flake, chip, or pellet form. As such, PET that would ordinarily be deposited in landfills can now be used productively and effectively. In one embodiment, PET component can also include other polyesters. The PET component can also include polyester copolymers. Examples of such materials include polyalkylene terephthalates that can be selected from polyethylene terephthalate, polycyclohexane terephthalate, copolyesters of terephthalate esters with comonomers containing cyclohexane-dimethanol and ethylene glycol, copolyesters of terephthalic acid with comonomers containing cyclohexanedimethanol and ethylene glycol, polybutylene terephthalate, poly-xylylene terephthalate, polydianol terephthalates, polybutylene terephthalate, polytrimethylene terephthalate, polyester naphthalates, and combinations thereof.

The modified polybutylene terephthalate component derived from polyethylene terephthalate is (1) is derived from a polyethylene terephthalate component selected from the group consisting of polyethylene terephthalate and polyethylene terephthalate copolymers and (2) has at least one residue derived from the polyethylene terephthalate component. In one embodiment, the modified polybutylene terephthalate component can further be derived from a biomass-derived 1,4-butanediol, e.g. corn derived 1,4-butanediol or a 1,4-butanediol derived from a cellulosic material.

The modified polybutylene terephthalate random copolymer can be derived from the polyethylene terephthalate component by any method that involves depolymerization of the polyethylene terephthalate component and polymerization of the depolymerized polyethylene terephthalate component with 1,4-butanediol to provide the modified polybutylene terephthalate random copolymer. For example, the modified polybutylene terephthalate component can be made by a process that involves depolymerizing a polyethylene terephthalate component selected from the group consisting of polyethylene terephthalate and polyethylene terephthalate copolymers, with a 1,4-butanediol component at a temperature from 180 to 230° C., under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butane diol, ethylene glycol, and combinations thereof; and agitating the molten mixture at subatmospheric pressure and increasing the temperature of the molten mixture to an elevated temperature under conditions sufficient to form a modified random polybutylene terephthalate copolymer containing at least one residue derived from the polyethylene terephthalate component.

Polyester moieties and the 1,4-butanediol are combined in the liquid phase under agitation and the 1,4-butanediol can be continuously refluxed back into the reactor during step (a). The tetrahydrofuran (THF) and water formed in the stage can be removed by distillation or partial condensation.

The polyethylene terephthalate component and the 1,4-butane diol component are generally combined under atmospheric pressure. In another embodiment of the invention, however, it is possible to use pressures that are higher than atmospheric pressures. For instance, in one embodiment, the pressure at which the polyethylene terephthalate component and the 1,4-butanediol are subjected to is 2 atmospheres or higher. For higher pressures, the reaction mixtures can be depolymerized at temperatures higher than 230° C.

The temperature at which the polyethylene terephthalate component and the 1,4-butanediol component are combined and reacted is sufficient to promote depolymerization of the polyethylene terephthalate component into a mixture of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof. The temperature at which the polyethylene terephthalate component and the 1,4-butanediol component are combined generally ranges from 180 to 230° C. 1,4-Butanediol is generally used in excess amount relative to the polyethylene terephthalate component. In one embodiment, 1,4-butanediol is used in a molar excess amount from 2 to 20.

During the initial stage of the process when the polyethylene terephthalate component and the 1,4-butanediol are combined and react ("step (a)"), the polyethylene terephthalate component and the 1,4-butanediol depolymerize into a molten mixture at a pressure that is at least atmospheric pressure suitable conditions. 1,4-Butanediol and ethylene glycol are generally recirculated, and tetrahydrofuran is distilled during "step (a)" of the process. The molten mixture contains oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butane diol, ethylene glycol, and combinations thereof.

The duration of the step in which polyethylene terephthalate component reacts with 1,4-butanediol can vary, depending on factors, such as available equipment, production needs, desired final properties, and the like. In one embodiment, this step is carried out in at least 2 hours. In another embodiment, the step is carried out from 2 to 5 hours.

The process further includes the step of subjecting the molten mixture to subatmospheric pressure and increasing the temperature of the molten mixture to a temperature from 240 to 260° C., and thereby forming the modified polybutylene terephthalate component derived from the polyethylene terephthalate component.

Excess butanediol, ethylene glycol, and THF are preferably removed and step (b) is carried out under agitation. The molten mixture, when placed in subatmospheric pressure conditions at a suitable temperature for a sufficiently long time period, polymerizes into a modified polybutylene terephthalate component derived from the polyethylene terephthalate component random copolymer. Generally, the molten mixture pressure is subjected to a pressure from subatmospheric to less than 1 Torr. In one embodiment, the pressure is reduced to a pressure from 100 to 0.05 Torr in a continuous manner. In another embodiment, the pressure is reduced to a pressure from 10 to 0.1 Torr in a continuous fashion. Advantageously, the molten mixture can be placed under subatmospheric conditions without isolation and dissolution of any material from the molten mixture. The avoidance of this step greatly enhances the utility of the process.

During the step when the molten mixture is placed under subatmospheric conditions and the temperature is increased, excess butanediol, ethylene glycol, and THF are removed from the reactor and oligomers are allowed to build in molecular weight. Agitation can be continuously provided to facilitate the removal of the low boiling components and allow the molecular weight buildup of the polymer. After sufficient molecular weight is obtained, the resulting molten PBT polymer is cast from the reactor through a diehead, cooled with water, stranded and chopped into pellets.

The duration of the step (step (b) discussed above) in which the molten mixture polymerizes from polyethylene terephthalate and poly(butylene terephthalate) oligomers, 1,4-butane diol, and ethylene glycol can vary, depending on factors, such as equipment available, production needs, desired final properties, and the like. In one embodiment, this step is carried out in at least two hours. In another embodiment, the step is carried out from 2 to 5 hours.

The temperature at which the molten mixture is placed under subatmospheric conditions is sufficiently high to promote polymerization of the polyethylene terephthalate and poly(butylene terephthalate) oligomers, 1,4, butane diol, and ethylene glycol to the modified polybutylene terephthalate component derived from the polyethylene terephthalate component. Generally, the temperature is at least 230° C. In one embodiment, the temperature is from 250 to 275° C.

Both steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out. In another embodiment, the process can be carried out in more than two reactors. In another embodiment, the process can be carried out in a continuous series of reactors.

The catalyst component that facilitates the reaction can be selected from antimony compounds, tin compounds, titanium compounds, combinations thereof as well as many other metal catalysts and combinations of metal catalysts that have been disclosed in the literature. The amount of the catalyst will vary depending on the specific need at hand. Suitable amounts of the catalyst range from 1 to 5000 ppm, or more. The catalyst component is generally added during the step when the polyethylene terephthalate component initially combines with the 1,4-butanediol component. In another embodiment, however, the catalyst component may be added to the molten mixture that forms after the polyethylene terephthalate component and the 1,4-butanediol component are combined.

The process for making the modified polybutylene terephthalate random copolymer is preferably carried out under agitative conditions. The term "agitative conditions" or "agitation" refers to subjecting the polyethylene terephthalate component and the 1,4-butanediol or the molten mixture to conditions that involve physically mixing the polyethylene terephthalate component 1,4-butanediol or molten mixture under conditions that promote the depolymerization of the PET when the agitative conditions are applied to polyethylene terephthalate component 1,4-butanediol, i.e., step (a), or the polymerization of the PBT from polyethylene terephthalate oligomers, 1,4-butanediol, and ethylene glycol, i.e., step (b). The physical mixing can be accomplished by any suitable way. In one embodiment, a mixer containing rotating shaft and blades that are perpendicular to the shaft can be used.

The process for making the modified polybutylene terephthalate random copolymer can include a step that reduces the amount of THF produced during the process by adding a basic compound containing an alkali metal to the reactor in step (a) and thereby reducing formation of THF. The basic compound contains an alkali metal and can be, for example, sodium alkoxides, sodium hydroxide, sodium acetate, sodium carbonate, sodium bicarbonates, potassium alkoxides, potassium hydroxide, potassium acetate, potassium carbonate, potassium bicarbonate, lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminum alkoxides, aluminum hydroxide, aluminum acetate, aluminum carbonate, aluminum bicarbonates, and combinations thereof. The amount of the basic compound added to a mixture is generally at least 0.1 ppm. In one embodiment, the amount of the basic compound is from 0.1 to 50 ppm. In another embodiment, the amount of the basic compound ranges from 1 to 10 ppm.

In another embodiment, a difunctional epoxy compound can be added to reduce the formation of THF. The epoxy compounds may be selected from the group of difunctional epoxies. Examples of suitable difunctional epoxy compounds include and are not limited to 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4-epoxycyclohexylcarboxylate. The amount of the epoxy added to the mixture is generally at least 0.05 wt. %. In one embodiment, the amount of the epoxy compound is from 0.1 to 1 wt. %. In another embodiment, the amount of the epoxy compound was 0.2 to 0.5 wt. %.

In another embodiment, THF production is reduced by a process that involves the steps of: (a) reacting (i) a polyethylene terephthalate component selected from the group consisting of polyethylene terephthalate and polyethylene terephthalate copolymers with a diol component selected from the group consisting of ethylene glycol, propylene glycol, and combinations thereof, in a reactor at a pressure that is at least atmospheric pressure in the presence of a catalyst component at a temperature from 190° C. to 250° C., under an inert atmosphere, under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof; wherein the polyethylene terephthalate component and the diol component are combined under agitation; (b) adding 1,4-butanediol to the first molten mixture in a reactor in the presence of a catalyst component at a temperature from 190 to 240° C., under conditions that are sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof; and (c) increasing the temperature of the second molten mixture under subatmospheric conditions and agitation to a temperature from 240 to 260° C., thereby forming a modified random polybutylene terephthalate copolymer containing at least one residue derived from the polyethylene terephthalate component.

This three-step embodiment provides an additional advantageous way for producing modified PBT random copolymers from PET. The diol component used in step (a) of the three step embodiment can be selected from ethylene glycol, propylene glycol, and combinations thereof. The diol component can be present in step (a) at a molar amount that is at least half the amount of ethylene glycol moieties present in the polyethylene terephthalate component. The depolymerization of the polyethylene terephthalate component can be carried out for various times. In one embodiment, the depolymerization is carried out for at least 25 minutes. The 1,4-butanediol used during step (b) of the three step embodiment can be added at a molar amount that is in excess relative to the molar amount of butanediol moieties incorporated into the modified polybutylene terephthalate random copolymer component obtained in step (c). During the process the compounds used in the process can be reused and/or collected. In one embodiment, the diol component selected from the group consisting of ethylene glycol, propylene glycol, and combinations thereof and (2) 1,4-butanediol are removed and collected in a vessel in step (b). In another embodiment, in step (b), 1,4-butanediol is refluxed back into the reactor and a component selected from the group of excess butanediol, ethylene glycol, propylene glycol, tetrahydrofuran, and combinations thereof is removed. Step (b) is practiced for a sufficient period of time to reduce at least 65% of ethylene glycol from the second molten mixture. The duration of step (b) can also vary. In one embodiment, step (b) lasts at least 45 minutes. The pressure at which step (b) is carried out can vary. In one embodiment, step (b) is carried out in atmospheric conditions. In another embodiment, step (b) is carried out in subatmospheric conditions. Different combinations are possible. In one embodiment, step (b) is carried out with excess 1,4-butanediol and at a pressure from 300 to 1500 mbar absolute. In another embodiment, 1,4-butanediol is used in a molar excess amount from 1.1 to 5. Step (c) of the three-step embodiment can also be carried out with modifications, depending on the application. In one embodiment, for instance, a component selected from the group of excess butanediol, ethylene glycol, propylene glycol, tetrahydrofuran, and combinations thereof is removed during step (c). The pressure at which step (c) is carried out can also vary. In one embodiment, step (c) is carried out at a pressure that is less than 10 mbar. The three-step process can be carried out in the same reactor. Alternatively, the three-step process can be carried out in at least two reactors.

In another embodiment, the three-step process can include the step of adding a basic compound during step (a), step (b), step (c), and combinations thereof, and thereby further reduce THF production. The basic compound, as in the two-step embodiment, can contain those compounds mentioned above. Alternatively, difunctional epoxy compounds can be added during step (b) in the amounts indicated above.

The process for making the modified PBT random copolymer may contain an additional step in which the PBT formed from the molten mixture is subjected to solid-state polymerization. Solid-state polymerization generally involves subjecting the PBT formed from the molten mixture to an inert atmosphere or subatmospheric pressure and heating to a temperature for a sufficient period of time to build the molecular weight of the PBT. Generally, the temperature to which the PBT is heated is below the melting point of the PBT, e.g., from 5 to 60° C. below the melting point of the PBT. In one embodiment, such a temperature may range from 150 to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the PBT to a suitable molecular weight. Such tumultuous conditions may be created by subjecting the PBT to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar.

In still another embodiment, the 1,4-butanediol used to make the modified polybutylene terephthalate random copolymer can be derived from biomass. The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based butanediol can be obtained from several sources. For instance, the following process can be used to obtain biomass-based 1,4-butanediol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butanediol by processes described in several published documents such as in U.S. Pat. No. 4,096,156, incorporated herein in its entirety. Bio-mass derived-1,4-butanediol can also be converted to tetrahydrofuran, and further converted to polytetrahydrofuran, also known as polybutylene oxide glycol. Smith et al. describe another process that describes converting succinic acid into 1,4-butane diol in Life Cycles Engineering Guidelines, as described in EPA publication EPA/600/R-1/101 (2001). When this embodiment is used, the manufacture of compositions containing the modified polybutylene terephthalate can further reduce $CO_2$ emissions that are ordinary generated when PBT is made from fossil fuel derived monomers. Also, this further reduces the amount of non-renewable hydrocarbon sources that are used in order to make the PBT.

The amount of the modified PBT random copolymer in the compositions varies with the specific application. Generally, the modified PBT random copolymer functions as the polyester component of the composition. The polyester component can be used in amounts that comprises more than 0, up to 100 wt. % of the modified PBT random copolymer, specifically from 1 to 99 wt. %, more specifically from to 5 to 90 wt. %, even more specifically from 10 to 80 wt. %, still more especially from 20 to 70 wt. %, or from 30 to 60 wt. %.

Our invention, however, includes embodiments where the modified PBT random copolymer can be used in conjunction with virgin polyesters, polyesters derived from monomers. Preferred polyesters that are used in combination with the modified PBT random copolymer are obtained by copolymerizing a glycol component and an acid component comprising at least 70 mole %, preferably at least 80 mole %, of terephthalic acid, or polyester-forming derivatives thereof. The preferred glycol, tetramethylene glycol, component can contain up to 30 mole %, preferably up to 20 mole % of another glycol, such as ethylene glycol, trimethylene glycol, 2-methyl-1,3-propane glycol, hexamethylene glycol, decamethylene glycol, cyclohexane dimethanol, neopentylene glycol, and the like, and mixtures comprising at least one of the foregoing glycols. The preferred acid component may contain up to 30 mole %, preferably up to 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethanedicarboxylic acid, sebacic acid, adipic acid, and the like, and polyester-forming derivatives thereof, and mixtures comprising at least one of the foregoing acids or acid derivatives.

In one embodiment, the polyester is poly(ethylene terephthalate), poly(1,4-butylene terephthalate), poly(ethylene naphthalate), poly(1,4-butylene naphthalate), (polytrimethylene terephthalate), poly(1,4-cyclohexylenedimethylene 1,4-cyclohexanedicarboxylate), poly(1,4-cyclohexylene-dimethylene terephthalate), poly(1,4-butylene-co-1,4-but-2-ene diol terephthalate), and/or poly(cyclohexylenedimethylene-co-ethylene terephthalate). Specifically, the polyester is poly(1,4-butylene terephthalate).

A preferred polyester can have a number average molecular weight of 10,000 atomic mass units (a.m.u.) to 200,000 a.m.u., as measured by gel permeation chromatography using polystyrene standards. Within this range, a number average molecular weight of at least 20,000 a.m.u. is preferred. Also within this range, a number average molecular weight of up to 100,000 a.m.u. is preferred, and a number average molecular weight of up to 50,000 a.m.u. is more preferred. In a specific embodiment, the polyester has a weight average molecular weight of greater than 45,000 a.m.u., specifically a poly(butylene terephthalate) having a weight average molecular weight of greater than 45,000 a.m.u.

The polyester can be present in the composition at 20 to 90 weight percent, based on the total weight of the composition. Within this range, it is preferred to use at least 25 weight percent, even more preferably at least 30 weight percent of the polyester such as poly(butylene terephthalate). In one embodiment, the polyester is present in an amount of 20 to 80 weight percent, based on the total weight of the composition, specifically 35 to 65 weight percent, even more specifically 40 to 65 weight percent, each based on the total weight of the composition.

In a further embodiment the composition can contain a second polyester resin that is different from the first polyester that is derived from monomers. For the second polyester, suitable resins include those derived from a $C_2$-$C_{10}$ aliphatic or cycloaliphatic diol, or mixtures thereof, and at least one aromatic dicarboxylic acid. Preferred polyesters are derived from an aliphatic diol and an aromatic dicarboxylic acid having repeating units of the following general formula: wherein n is an integer of from 2 to 6, and R is a $C_6$-$C_{20}$ divalent aryl radical comprising a decarboxylated residue derived from an aromatic dicarboxylic acid.

Examples of aromatic dicarboxylic acids represented by the decarboxylated residue R are isophthalic acid, terephthalic acid, 1,2-di(p-carboxyphenyl)ethane, 4,4'-dicarboxydiphenyl ether, 4,4'-bisbenzoic acid, and the like, and mixtures thereof. All of these acids contain at least one aromatic nucleus. Acids containing fused rings can also be present, such as in 1,4-, 1,5-, or 2,6-naphthalene dicarboxylic acids. Preferred dicarboxylic acids include terephthalic acid, isophthalic acid, naphthalene dicarboxylic acids, and the like, and mixtures comprising at least one of the foregoing dicarboxylic acids.

The aliphatic or alicyclic polyols include glycols, such as ethylene glycol, propylene glycol, butanediol, hydroquinone, resorcinol, trimethylene glycol, 2-methyl-1,3-propane glycol, 1,4-butanediol, hexamethylene glycol, decamethylene glycol, 1,4-cyclohexane dimethanol, or neopentylene glycol.

Also contemplated herein are the above polyesters with minor amounts, e.g., 0.5 to 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. Nos. 2,465,319 to Whinfield et al., and 3,047,539 to Pengilly.

Block copolyester resin components are also useful, and can be prepared by the transesterification of (a) straight or branched chain poly(alkylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. Especially useful when high melt strength is important are branched high melt viscosity resins, which include a small amount of, e.g., up to 5 mole percent based on the acid units of a branching component containing at least three ester forming groups. The branching component can be one that provides branching in the acid unit portion of the polyester, in the glycol unit portion, or it can be a hybrid branching agent that includes both acid and alcohol functionality. Illustrative of such branching components are tricarboxylic acids, such as trimesic acid, and lower alkyl esters thereof, and the like; tetracarboxylic acids, such as pyromellitic acid, and lower alkyl esters thereof, and the like; or preferably, polyols, and especially preferably, tetrols, such as pentaerythritol; triols, such as trimethylolpropane; dihydroxy carboxylic acids; and hydroxydicarboxylic acids and derivatives, such as dimethyl hydroxyterephthalate, and the like. Branched poly(alkylene terephthalate) resins and their preparation are described, for example, in U.S. Pat. No. 3,953,404 to Borman. In addition to terephthalic acid units, small amounts, e.g., from 0.5 to 15 mole percent of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexylenedimethanol, etc., as well as minor amounts of trifunctional, or higher, branching components, e.g., pentaerythritol, trimethyl trimesate, and the like.

In a specific embodiment, the modified polybutylene terephthalate random copolymer can be combined with more than 0 to 30, i.e., up to 30 weight percent (wt. %) of one or more of any of the foregoing different polyesters.

The flame retardant polyester composition includes a flame retarding quantity of one or a mixture of nitrogen-containing flame retardants such as triazines, guanidines, cyanurates, and isocyanurates. Preferred triazines have the formula wherein $R^1$, $R^2$, and $R^3$ are independently $C_1$-$C_{12}$ alkyl, $C_1$-$C_{12}$ alkoxyl, $C_6$-$C_{12}$ aryl, amino, $C_1$-$C_{12}$ alkyl-substituted amino, or hydrogen. Highly preferred triazines include 2,4, 6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid may be used in the composition. Examples include melamine pyrophosphate and melamine polyphosphate. Preferred cyanurate/isocyanurate compounds include salts/adducts of the triazine compounds with cyanuric acid, such as melamine cyanurate and any mixtures of melamine salts.

Preferred guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame retardant may be present in the composition at 1 to 25 weight percent, based on the total weight of the composition. Within this range, it is preferred to use at least 5 weight percent, even more preferably at least 8 weight percent of the nitrogen-containing flame retardant. Also within this range, it is preferred to use up to 20 weight percent.

In a specific embodiment, it has been found advantageous to use from 1 to 25 wt. % of a melamine polyphosphate, melamine cyanurate, melamine pyrophosphate, and/or melamine phosphate, based on the total weight of the composition. Particularly good results are obtained using from 1 to 25 wt. % of a melamine polyphosphate and/or melamine cyanurate, specifically 8 to 20 wt. % of melamine polyphosphate and/or melamine cyanurate, based on the total weight of the composition.

The nitrogen-containing flame-retardants are used in combination with one or more phosphinic acid salts. The phosphinates and diphosphinates include those set forth in U.S. Pat. No. 6,255,371 to Schosser et al. The specification of this patent, column 1, line 46 to column 3 line 4 is incorporated by reference into the present specification. Specific phosphinates mentioned include aluminum diethylphosphinate (DEPAL), and zinc diethylphosphinate (DEPZN). The phosphinates have the formula (I) $[(R^1)(R^2)(PO)—O]_m^- M^{m+}$ and formula II $[(O—POR^1)(R^3)(POR^2—O)]_2^{2-} M^{m+}$, and/or polymers comprising such formula I or II, wherein $R^1$ and $R^2$ are identical or different and are H, $C_1$-$C_6$-alkyl, linear or branched, or $C_6$-$C_{10}$-aryl; $R^3$ is $C_1$-$C_{10}$-alkylene, linear or branched, $C_6$-$C_{10}$-arylene, -alkylarylene or -arylalkylene; M is an alkaline earth metal, alkali metal, Al, Ti, Zn, Fe, or boron; m is 1, 2, 3 or 4; n is 1, 2, or 3; and x is 1 or 2. In one embodiment $R^1$ and $R^2$ are the same and are $C_1$-$C_6$-alkyl, linear or branched, or phenyl; $R^3$ is $C_1$-$C_{10}$-alkylene, linear or branched, $C_6$-$C_{10}$-arylene, -alkylarylene or -arylalkylene; M is magnesium, calcium, aluminum or zinc; m is 1, 2 or 3; n is 1, 2 or 3; and x is 1 or 2. The structures of formula I and II are specifically incorporated by reference from the Schosser patent into the present application. Note that $R^1$ and $R^2$ can be H, in addition to the substituents referred to set forth in the patent. This results in a hypophosphite, a subset of phosphinate, such as calcium hypophosphite, aluminum hypophosphite, and the like.

In a specific embodiment, the composition comprises from 1 to 25 wt. %, specifically from 7 to 20 wt. % of a flame retardant phosphinate of the formula (Ia)

a flame retardant diphosphinate of the formula (IIa)

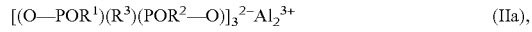

or a flame retardant polymer comprising formula (Ia) or (IIa), wherein $R^1$ and $R^2$ are identical or different and are H, $C_1$-$C_6$-alkyl, linear or branched, or $C_6$-$C_{10}$-aryl; $R^3$ is $C_1$-$C_{10}$-alkylene, linear or branched, $C_6$-$C_{10}$-arylene, -alkylarylene or -arylalkylene.

The charring polymer is a polymer that has not more than 85% weight loss at 400-500° C. upon heating under nitrogen using a thermogravimetric analysis (TGA) at a heating rate of 20° C. per minute. Typical charring polymers include polyetherimides, poly(phenylene ether), poly(phenylenesulfide), polysulphones, polyethersulphones, poly(phenylenesulphide oxide (PPSO), andpolyphenolics (e.g., Novolac). The charring polymer is present in an amount from 0.1 to 15 percent by weight of the composition. In a specific embodiment, a polyetherimide is used, specifically an aromatic polyetherimide. The polyetherimide is present in an amount from more than 0 to 25 wt. %, specifically 0.1 to 25 wt. %, even more specifically from 2 to 8 wt. %, each based on the total weight of the composition. It has unexpectedly been found that the presence of a polyetherimide in compositions comprising aluminum phosphinate salts improve the mechanical properties of the compositions, in particular tensile strength and impact properties. High temperature molding stability is also improved, as well as melt stability.

The compositions may, optionally, further comprise a reinforcing filler. Suitable reinforcing fillers include silica; silicates such as talc or mica; carbon black; and reinforcing fibers, such as carbon fiber, aramide fiber, glass fiber, and the like; and mixtures comprising at least one of the foregoing fillers. In a preferred embodiment, the reinforcing filler comprises glass fibers. For compositions ultimately employed for electrical uses, it is preferred to use fibrous glass fibers comprising lime-aluminum borosilicate glass that is relatively soda free, commonly known as "E" glass. However, other glasses are useful where electrical properties are not so important, e.g., the low soda glass commonly known as "C" glass. The glass fibers may be made by standard processes, such as by steam or air blowing, flame blowing and mechanical pulling. Preferred glass fibers for plastic reinforcement may be made by mechanical pulling. The diameter of the glass fibers is generally 1 to 50 micrometers, preferably 1 to 20 micrometers. Smaller diameter fibers are generally more expensive, and glass fibers having diameters of 10 to 20 micrometers presently offer a desirable balance of cost and performance. The glass fibers may be bundled into fibers and the fibers bundled in turn to yarns, ropes or rovings, or woven into mats, and the like, as is required by the particular end use of the composition. In preparing the molding compositions, it is convenient to use the filamentous glass in the form of chopped strands of one-eighth to 2 inches long, which usually results in filament lengths between 0.0005 to 0.25 inch (0.0127 and 6.35 mm) in the molded compounds. Such glass fibers are normally supplied by the manufacturers with a surface treatment compatible with the polymer component of the composition, such as a siloxane, titanate, or polyurethane sizing, or the like.

When present in the composition, the reinforcing filler may be used at 10 to 60 weight percent, based on the total weight of the composition. Within this range, it is preferred to use at least 20 weight percent of the reinforcing filler. Also within this range, it is preferred to use up to 50 weight percent, more preferably up to 40 weight percent, of the reinforcing filler.

In another embodiment, the composition comprises from more than 0 to 50 wt. % of a reinforcing filler, specifically from 15 to 45 wt., more specifically from 20 to 35 wt. % of a reinforcing filler, based on the total weight of the composition. In another embodiment, the composition comprises 10 to 30 wt. % of a reinforcing filler, or, alternatively, depending on the end use of the composition, from 30 to 50 wt. % of a reinforcing filler. In the foregoing embodiment, the reinforcing filler is a particulate filler, a glass fiber, and a combination thereof.

The composition can further comprise one or more anti-dripping agents, which prevent or retard the resin from dripping while the resin is subjected to burning conditions. Specific examples of such agents include silicone oils, silica (which also serves as a reinforcing filler), asbestos, and fibrillating-type fluorine-containing polymers. Examples of fluorine-containing polymers include fluorinated polyolefins such as, for example, poly(tetrafluoroethylene), tetrafluoroethylene/hexafluoropropylene copolymers, tetrafluoroethylene/ethylene copolymers, polyvinylidene fluoride, poly(chlorotrifluoroethylene), and the like, and mixtures comprising at least one of the foregoing anti-dripping agents. A preferred anti-dripping agent is poly(tetrafluoroethylene). When used, an anti-dripping agent is present in an amount of 0.02 to 2 weight percent, and more preferably from 0.05 to 1 weight percent, based on the total weight of the composition.

The compositions may, optionally, further comprise other conventional additives used in polyester polymer compositions such as non-reinforcing fillers, stabilizers such as anti-oxidants, thermal stabilizers, radiation stabilizers, and ultra-violet light absorbing additives, mold release agents, plasticizers, quenchers, lubricants, antistatic agents and processing aids. Other ingredients, such as dyes, pigments, laser marling additives, and the like can be added for their conventionally employed purposes. A combination comprising one or more of the foregoing or other additives can be used.

In an advantageous feature, it has been found that flame retardancy can be achieved substantially in the absence of a halogenated, in particular a chlorinated and/or brominated organic flame retardant compound. In one embodiment, the compositions comprise 0 to 5 wt. % of a chlorinated and/or brominated organic compound. In another embodiment, the compositions comprise 0 to less than 3 wt. % of a chlorinated and/or brominated organic compound. In still another embodiment, the compositions comprise less than 2000 ppm, less than 500 ppm, or less than 100 ppm of a chlorinated and/or brominated organic flame retardant compound.

In another embodiment, where it is important to make compositions having a light grey or a white appearance, a composition can further include a mixture of zinc sulfide and zinc oxide in sufficient amounts to produce a composition having a light grey appearance or a white appearance. The specific amounts of mixtures of s zinc sulfide and zinc oxide can vary, depending on the application. In one embodiment, the zinc sulphide is present in an amount that is at least 3 weight percent, based on the total weight of the composition. In another embodiment, the zinc oxide is present in an amount that is at least 0.05 weight percent, based on the total weight of the composition. In another embodiment, the zinc sulphide is present in an amount ranging from 3 to 14 weight percent, based on the total weight of the composition. In another embodiment, the zinc oxide is present in an amount ranging from 0.05 to 14 weight percent, based on the total weight of the composition. The light gray or white composition can have LAB values that can vary. As further discussed below, the use of the mixture of zinc sulfide and zinc oxide produces a material of light gray or white appearance that does not emit an unpleasant odor that results from the formation of hydrogen sulfide.

In a specific embodiment, any compound added to quench the odor of the compositions does not significantly adversely affect the desired physical properties of the compositions, for example flame retardance, processing characteristics, impact strength, brittleness, and the like.

Other additives that can be used to quench the odor of the compositions, in particular sulfur-based odors, include silicon-containing compounds, for example organosilanes, organosilicones, and organosiloxanes. It has been found that effective silicon-containing compounds have a reactive group, e.g., amino groups, sulfhydryl groups, and reactive silicon-containing groups such as silicon hydride groups, alkoxysilyl groups such as trialkoxysilyl groups, dialkoxyalkylsilyl groups and alkoxydialkylsilyl groups, acyloxysilyl groups, and the like. Specific exemplary silicon-containing compounds include organosilanes, including amino-functional organotrialkoxysilanes, organosiloxanes containing a reactive hydride (i.e., an Si—H group), epoxy-modified silicones, and the like.

An organosilane has the general chemical formula $R_nSiR'_m$ where n is 1-3, specifically 1, and m is 4-n, R is a non hydrolyzable organic functional group (e.g., a C1-C14 hydrocarbon containing vinyl, epoxy, amino, methacryl, acryl, isocyanato, thiocyanato, mercapto, chloro, and the like), and R' a hydrolyzable group (e.g., acetoxy, alkoxy, chloro, hydride, and the like). The $C_{1-14}$ hydrocarbon can be a $C_{1-6}$ alkylene. Exemplary silanes include 3-methacryloxypropyltrimethoxysilane, 3-aminopropyl trialkoxysilanes such as 3-aminopropyl trimethoxysilane and 3-aminopropyl triethoxysilane, 3-glycidoxypropyltrimethoxysilane, trimethoxy vinylsilane, and poly(vinylmethoxysiloxane). Further, the alkoxysilane can be a bis(trialkoxysilane), for example an alkylene or polydimethylsilane chain terminated with —$SiOR'_{13}$ groups. The alkoxysilane can be at least partially hydrolyzed, for example a partially hydrolyzed tetraalkoxysilane or a hydrolyzed alkyl trialkoxy silane or aminoalkyl trialkoxy silane, can be used.

Organosiloxanes containing a reactive hydride include polydiorganosiloxanes of the formula $ZSiR_2$—$[OSiHR]_d$—$[OSiR_2]_e$—$OSiR_2Z$ wherein d has an average value from 0 to 10,000, e has an average value from 1 to 10,000, Z is hydrogen or R, and each R is independently a $C_{1-13}$ monovalent organic group, provided that at least one Z is hydrogen when d is zero. R can independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ allylaryl group, or $C_7$-$C_{13}$ alkylaryloxy group. The foregoing groups can be fully or partially halogenated with fluorine, chlorine, bromine, or iodine, or a combination thereof. Combinations of the foregoing R groups can be used in the same polymer. In one embodiment, R is methyl, trifluoromethyl, or phenyl; alternatively, each R is methyl. In a specific embodiment, the reactive silicone is a poly(methyl hydrogensiloxane) wherein each Z is R, more specifically methyl, and d and e have an average value from 10 to 10,000. Specifically, d has an average value from 10 to about 100. The value of d and e can be selected so as to provide a silicone fluid. Suitable fluids have a viscosity of 1 to about 50 cSt at 25°. The ratio of d:e units can be from 1:99 to 90:10, specifically from 10:90 to 50:50.

In a specific embodiment, a linear silicon hydride is of the formula

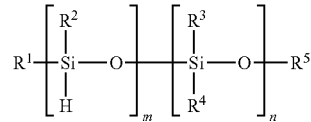

wherein $m \geq 1$ and $(m+n)=1-10,000$; $R^1$ and $R^2$ is each independently a hydrogen or $C_1$-$C_{13}$ alkyl, $C_1$-$C_{13}$ haloalkyl, $C_1$-$C_{13}$ alkoxy, $C_6$-$C_{14}$ aryl, $C_6$-$C_{14}$ haloaryl, $C_6$-$C_{10}$ aryloxy, $C_7$-$C_{13}$ alkylaryl, or $C_7$-$C_{13}$ haloalkylaryl; $R^3$ and $R^4$ is each independently a $C_1$-$C_{13}$ alkyl, $C_1$-$C_{13}$ haloalkyl, $C_1$-$C_{13}$ alkoxy, $C_6$-$C_{14}$ aryl, $C_6$-$C_{14}$ haloaryl, $C_6$-$C_{10}$ aryloxy, $C_7$-$C_{13}$ alkylaryl, $C_7$-$C_{13}$ haloalkylaryl, or $C_7$-$C_{13}$ alkylaryloxy; $R^5$ is a hydrogen, $C_1$-$C_{13}$ alkyl, $C_1$-$C_{13}$ haloalkyl, $C_6$-$C_{14}$ aryl, $C_6$-$C_{14}$ haloaryl, $C_7$-$C_{13}$ alkylaryl, or $C_7$-$C_{13}$ haloalkylaryl. In a specific embodiment, $R^1$ and $R^2$ is each independently hydrogen, methyl, ethyl, propyl, trifluoropropyl, phenyl, ethylphenyl, methoxy, ethoxy or phenoxy; $R^3$ and $R^4$ is each independently a methyl, ethyl, propyl, trifluoropropyl, phenyl, ethylphenyl, methoxy, ethoxy or phenoxy; and $R^5$ is a hydrogen, methyl, ethyl, propyl, trifluoropropyl, phenyl, or ethylphenyl.

In another specific embodiment, a cyclic silicon hydride is of the formula

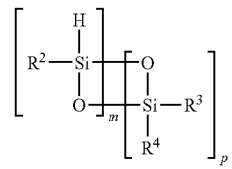

wherein $m \geq 1$ and $(m+p)=3-1000$; $R^2$ is a hydrogen or $C_1$-$C_{13}$ alkyl, $C_1$-$C_{13}$ haloalkyl, $C_1$-$C_{13}$ alkoxy, $C_6$-$C_{14}$ aryl, $C_6$-$C_{14}$ haloaryl, $C_6$-$C_{10}$ aryloxy, $C_7$-$C_{13}$ alkylaryl, or $C_7$-$C_{13}$ haloalkylaryl; and $R^3$ and $R^4$ is each independently a $C_1$-$C_{13}$ alkyl, $C_1$-$C_{13}$ haloalkyl, $C_1$-$C_{13}$ alkoxy, $C_6$-$C_{14}$ aryl, $C_6$-$C_{14}$ haloaryl, $C_6$-$C_{10}$ aryloxy, $C_7$-$C_{13}$ alkylaryl, $C_7$-$C_{13}$ haloalkylaryl, or $C_7$-$C_{13}$ alkylaryloxy. In a specific embodiment, $R^1$ is hydrogen, methyl, ethyl, propyl, trifluoropropyl, phenyl, or ethylphenyl; and $R^3$ and $R^4$ is each independently a methyl, ethyl, propyl, trifluoropropyl, phenyl, ethylphenyl, methoxy, ethoxy or phenoxy.

Suitable amounts of the silicon-containing quencher are in the range from 0.05 to 2 wt %, specifically from 0.1 to 1 wt %, based on the total weight of the composition.

The compositions can be prepared by a number of procedures. In an exemplary process, the polyester composition, optional amorphous additives, impact modifier and filler and/or reinforcing glass is put into an extrusion compounder with resinous components to produce molding pellets. The resins and other ingredients are dispersed in a matrix of the resin in the process. In another procedure, the ingredients and any reinforcing glass are mixed with the resins by dry blending, and then fluxed on a mill and comminuted, or extruded and chopped. The composition and any optional ingredients can also be mixed and directly molded, e.g., by injection or transfer molding techniques. Preferably, all of the ingredients are freed from as much water as possible. In addition, compounding should be carried out to ensure that the residence time in the machine is short; the temperature is carefully controlled; the friction heat is utilized; and an intimate blend between the resin composition and any other ingredients is obtained.

Preferably, the ingredients are pre-compounded, pelletized, and then molded. Pre-compounding can be carried out in conventional equipment. For example, after pre-drying the polyester composition (e.g., for four hours at 120° C.), a single screw extruder may be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) may be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions, such as a Newbury type injection molding machine with conventional cylinder temperatures, at 230° C. to 280° C., and conventional mold temperatures at 55° C. to 95° C. The compositions provide an excellent balance of impact strength, and flame retardancy.

In embodiments where the compositions are of a light grey or a white color, a composition can be made by a method that includes a method for the manufacture of a composition, which comprises blending the components of the composition and further includes that step of adding a mixture of zinc sulfide and zinc oxide in sufficient amounts (i) to produce a composition having a light grey or white appearance and (ii) to inhibit formation of hydrogen sulfide. Hydrogen sulfide emits a highly undesirable odor and inhibiting the formation of such gas makes the use of such a material highly useful. In one embodiment, the zinc sulphide is present in an amount ranging from 3 to 14 weight percent, based on the total weight of the composition. In another embodiment, the zinc oxide is present in an amount ranging from 0.05 to 14 weight percent, based on the total weight of the composition.

In particular, the compositions provide excellent flame retardancy when molded into either thick or thin components. For example, a 0.8 mm thick molded sample comprising the composition can have a UL-94 flammability rating of V0. A 0.4 mm thick molded sample comprising the composition can have a UL-94 flammability rating of V0.

In addition to good flame retardancy, the a molded article comprising the composition can have a tensile strength at yield from to 90 to 120 MPa, measured in accordance with ISO 527.

A molded article comprising the composition can have good impact properties, for example, an unnotched Izod impact strength from to 20 to 50 KJ/m2, measured at 23° C. in accordance with ISO 180.

A molded article comprising the composition can have a heat deflection temperature from 175 to 225° C., measured in accordance with ISO 75 at 1.8 MPa.

The composition can further have good tensile properties. A molded article comprising the composition can have a tensile modulus of elasticity from 8.0 to 10.0 GPa, or from 8.0 t0 15 GPa, measured in accordance with ISO 527. A molded article comprising the composition can have an elongation at break from 1 to 3%, measured in accordance with ISO 527. A molded article comprising the composition can have a tensile strength at yield from to 90 to 120 MPa, measured in accordance with ISO 527.

The compositions are also heat stable. For example, the compositions maintain at least 80% of their initial weight average molecular weight after molding at 265° C., 275° C., or 285° C. Alternatively, or in addition, our compositions can have a polydispersity index after molding at 265° C., 275° C., or 285° C. that is from 80% to 120% of the polydispersity index of the composition prior to molding.

In a specific embodiment, the compositions can have a combination of highly useful physical properties. For example, a molded article comprising the composition can have an unnotched Izod impact strength of equal to 20 to 50 KJ/m$^2$, measured at 23° C. in accordance with ISO 180 and a heat deflection temperature from 175 to 225° C., measured in accordance with ISO 75 at 1.8 MPa; and a 0.8 mm thick molded sample comprising the composition can have a UL-94 flammability rating of V0.

One or more of the foregoing properties can be achieved by a composition that consists essentially of a poly(1,4-butylene terephthalate); a flame retardant phosphinate of the formula (Ia), (IIa), and/or a flame retardant polymer derived from formula (Ia) or (IIa); melamine polyphosphate and/or melamine cyanurate; an aromatic polyetherimide; and a reinforcing filler. In particular, the foregoing composition achieves good flame retardancy for samples having a thickness of 0.4 and 0.8 mm, and good impact and tensile strength. Better high temperature molding stability and melt stability are also seen.

An additional preferred embodiment encompasses molded articles made from the composition, such as electric and electronic parts, including, for example, connectors, circuit breakers, lamp holders, Fusers, Power distribution box, Enclosures, and power plugs. Injection molded articles can be specifically mentioned, for example an injection molded connector. Other articles include fans, e.g., fans used in electronic devices such as computers.

It should be clear that the invention encompasses reaction products of the above described compositions.

Advantageously, a molding composition containing the modified polybutylene terephthalate random copolymers can have a reduced $CO_2$ emissions index. The reduced $CO_2$ emissions index, as defined in this application, is the amount of $CO_2$, expressed in kg, that is saved when one (1) kg of a composition containing the modified polybutylene terephthalate random copolymers is made, as compared to the amount of $CO_2$, expressed in kg, that is created when the composition is made with polybutylene terephthalate that is derived from monomers. Generally, our compositions generally have a reduced $CO_2$ emissions index that is more than approximately 0.06 kg, and can range from 0.06 kg to 2.25.

The basis for this feature is discussed below. The difference between the amount of $CO_2$ that is created during ordinary processes for making virgin, monomer-derived PBT and the process for making 1 kg of the modified polybutylene terephthalate random copolymers can range from 1.3 kg to 2.5 kg, or more suitably from 1.7 kg to 2.2 kg. It should be noted that this difference is based on calculations for the entire process that starts from crude oil to the monomers to the PBT versus scrap PET to oligomers to the modified PBT. In other words, the process for making 1 kg of the modified polybutylene terephthalate random copolymers creates 1.3 to 2.5 kilograms less $CO_2$ as compared to the process for making 1 kg of virgin PBT from crude oil. To determine the ranges of the reduced $CO_2$ emissions index for our compositions (which have the modified PBT random copolymers present in an amount ranging from 5 to 90 wt. %), the $CO_2$ reduction index can be calculated by multiplying the lower amount of the polybutylene terephthalate present in the composition, in percentage terms, with 1.3 (0.05×1.3=0.065) and the higher amount of the polybutylene terephthalate times 2.5. (0.90×2.5=2.25).

These results can be derived and verified by using material and energy balance calculations (calculations that are well known in the chemical engineering art) and comparing the amount of energy used to make modified PBT random copolymers from PET and the amount of energy used to make PBT from terephthalic acid.

The invention is further illustrated by the following non-limiting examples. In the following formulations, the amount of each component is in weight percent, based on the total weight of the composition.

EXAMPLES AND COMPARATIVE EXAMPLES

Examples 1-5 and Comparative Examples A-G

Formulations A-G and 1-5 below are made by dry-blending of ingredients with the exception of tetraphenyl BPA-diphosphate (BPA-DP) and glass fiber. The blends are subsequently compounded on a Werner-Pfleiderer 25 mm co-rotating extruder, where BPA-DP and glass were fed separately downstream of the blend. The extruder temperature settings (upstream to downstream) were 50-140-265-260-260-260-260-260-275° C.; a vacuum of 0.45 bar was applied and the screw rotation rate was 300 RPM.

Molding of parts was performed on a 35 ton Engel injection molding machine with temperature settings of 245-255-265-265° C. (from throat to nozzle) and a mold temperature of 70° C. for the PBT-based formulations. Prior to molding the pellets were pre-dried at 120° C. for 2-4 hrs.

Test specimens were evaluated for Izod unnotched Impact (IUI) strength in accordance with ISO 180, and results are expressed in units of kJ/m2. UL94 testing was employed for the flame retardance testing. The tensile strength was evaluated using ISO527. The polybutylene terephthalate (PBT) employed was VALOX® 315 PBT, a high melt viscosity PBT and VALOX® 195 PBT, a low melt viscosity PBT, used in the weight ratio of 2:1 and sold by SABIC Innovative Plastics IP B.V. MELAPUR® MC-25 is melamine cyanurate from Ciba Specialty Chemicals Corporation. TSAN is available from SABIC Innovative Plastics IP B.V. and is a fibrillating type Teflon in styrene acrylonitrile. BPA-DP is bisphenol A diphosphate from Albemarle. PPO is polyphenylene oxide from SABIC Innovative Plastics IP B.V. (polyphenylether of 2,6-xylenol). ULTEM™ 1010 is polyetherimide from SABIC Innovative Plastics IP B.V. Standard stabilizers are used such as IRGANOX® 1010, a phenolic antioxidant sold by Ciba Specialty Chemicals Corporation, and/or epoxy. Standard pigments employed include zinc sulfide.

The results of the different formulations are shown in Table 1.

TABLE 1

| | A | B | C | 1 | 2 | D | E | 3 | F | 4 | G | 5 |
|---|---|---|---|---|---|---|---|---|---|---|---|---|
| Component | | | | | | | | | | | | |
| PBT | 33.55 | 33.55 | 41.55 | 36.55 | 36.55 | 45.55 | 47.55 | 41.55 | 51.55 | 47.55 | 49.35 | 42.35 |
| MC-25 | 10 | 10 | 12.5 | 12.5 | 12.5 | 10 | 10 | 10 | 10 | 10 | 10 | 10 |
| TSAN | 0.50 | 0.5 | 0.5 | 0.5 | 0.5 | 0.5 | 0.5 | 0.5 | 0.5 | 0.5 | 0.5 | 0.5 |
| ULTEM-1010 | 5 | — | — | 5 | — | — | — | 5 | — | 5 | — | 5 |
| PPO-803 | — | 5 | — | — | 5 | — | — | — | — | — | — | — |
| BPA-DP | 18 | 18 | — | — | — | — | — | — | — | — | — | — |
| Zn salt of diethylphophinic acid | — | — | 12.5 | 12.5 | 12.5 | 15 | 15 | 15 | 10 | 10 | — | — |
| Calcium hypophosphite | — | — | — | — | — | — | — | — | — | — | 15 | 15 |
| Stabilizers | 1.15 | 1.15 | 1.15 | 1.15 | 1.15 | 1.15 | 1.15 | 1.15 | 1.15 | 1.15 | 1.15 | 1.15 |
| Pigments | 1.8 | 1.8 | 1.8 | 1.8 | 1.8 | 1.8 | 1.8 | 1.8 | 1.8 | 1.8 | 1.8 | 1.8 |
| Glass fiber | 30 | 30 | 30 | 30 | 30 | 25 | 25 | 25 | 25 | 25 | 25 | 25 |
| Properties | | | | | | | | | | | | |
| IUI (kJ/m$^2$) | 35.1 | 29.1 | 22.4 | 22.6 | 14.2 | 24.9 | 27 | 30.5 | 35.1 | 37.6 | 28.4 | 24 |
| UL rating at 1.5 mm | V0 | NC | V0 | V0 | V0 | V1 | V1 | V0 | NR | V1 | V1 | V0 |
| UL rating at 0.8 mm | — | — | V1 | V0 | V0 | V2 | V2 | V1 | NR | NR | V2 | V2 |
| Tensile strength retention after 1 week of aging at 140° C. | <50% | <50% | >80% | >80% | >80% | >80% | >80% | >80% | >80% | >80% | >80% | >80% |

Comparative samples A and B show that by using a phosphorus-containing compound such as BPA-DP good thermal stability is not obtained, as the tensile strength retention after 1 week at 140 C is lower than 50%. For the formulations based on a phosphinate, the retention is higher than 80%.

Examples 1 and 2, in accordance with the invention, show that the UL-performance at 0.8 mm is V0, in contrast with comparative sample C. The addition of a charring polymer therefore gives better UL-performance, while the tensile strength retention is still good. Polyetherimide (ULTEM from Sabic) is preferred over polyphenylene ether (PPO from Sabic), due to the higher impact values of the compositions containing the polyetherimide.

Upon using lower amounts of melamine cyanurate it can be seen that the impact improves, but a charring polymer (formulation 3) is needed to maintain a V0 performance at 1.5 mm; the comparative samples D and E result only in a V1 performance. Upon further lowering the flame retardant amounts, in this case the phosphinate amount, it can be seen that the UL-performance drops to NC (non-classified) or NR (not-rated) for comparative sample F, but for sample 4 the material still has a V1 performance. Also in the case of calcium hypophosphite (calcium phosphinate) addition of a charring polymer (formulation 5) result in better UL-performance without negative effects on the tensile strength retention.

From the results it can be concluded that a combination of a phosphinate compound with a charring polymer, in the presence of a nitrogen compound, gives the best balance in properties as UL-performance and tensile strength retention upon oven aging. Without the charring agent or in case of another Phosphorus compound (as BPA-DP) these results could not be obtained.

Examples 6-9 and Comparative Examples H-J

Materials

The components shown in Table 2 were used in Examples 6-9 and Comparative Examples H-J.

TABLE 2

| Component | Description | Source |
|---|---|---|
| PBT-315-Milled | Virgin polybutylene terephthalate | Sabic |
| PBT-315-iQ Pellets | Modified polybutylene terephthalate random copolymer | Sabic |
| OP 1240 | Aluminum phosphinate | Ticona/Clariant |
| MPP | Melamine polyphosphate | Ciba |
| MC | melamine cyanurate | Ciba |
| ULTEM ™ Resin | Aromatic polyetherimide | Sabic |
| Irganox 1010 | Antioxidant | Ciba |
| TSAN | Teflon encapsulated with styrene acrylonitrile | Sabic |
| PETS | Pentaerythritol tetrastearate | |
| NEG Glass T120 | Glass fibers | Nippon |

In these Examples and Comparative Examples, the formulations were dry blended and extruded in a 25 mm Werner & Pfleiderer ZSK co-rotating twin screw extruder with a vacuum vented mixing screw, using a screw speed of 300 rpm. Glass fibers were added through a side feeder in the fifth barrel. The temperature profile for compounding starting from feed zone to die zone was 100-200-230-250-265-265-265-270-270-270° C. The desired torque was maintained during the extrusion by changing the throughput rate to achieve optimum mixing. The extrudate was cooled through a water bath prior to pelletization. The pellets were dried for 4 hours at 120° C. in a forced air-circulating oven prior to injection molding.

Test specimens were injection molded on a 100 Ton L&T Demag injection molding machine as per ISO test protocols. The temperature profile for injection molding starting from feed zone to nozzle was 100-250-260-265-270° C. Tensile properties of the injection molded specimens were evaluated as per ISO 527 and unnotched Izod impact testing was performed in accordance with ISO 180. Flame testing was performed with both 1.5 mm and 0.8 mm thickness flame bars in accordance with UL-94. HDT was measured in flat wise direction as per ISO 75 at a heating rate of 120° C./hr.

Properties of various formulations using aluminum phosphinate, aromatic polyetherimide, melamine compounds, and virgin or modified PBT are shown in Table 3.

TABLE 3

| | Ex 6 | Ex 7 | CEx H | CEx I | Ex 8 | CEx J | CEx K |
|---|---|---|---|---|---|---|---|
| Component | | | | | | | |
| PBT-Regular | — | — | — | — | — | — | 51.7 |
| PBT-iQ | 51.70 | 46.70 | 56.70 | 51.70 | 49.2 | 54.2 | — |
| OP 1240 | 12.50 | 12.50 | 12.50 | 12.50 | 20.00 | 20.00 | 12.50 |
| MPP | 5.00 | 5.00 | 5.00 | 0 | 0 | 0 | 5.00 |
| Melamine Cyanurate | 0 | 0 | 0 | 5.00 | 0 | 0 | 0 |
| Ultem | 5.00 | 5.00 | 0 | 5.00 | 5.00 | 0 | 5.00 |
| Glass Fiber NEG T-120 | 25.00 | 30.00 | 25.00 | 25.00 | 25.00 | 25.00 | 25.00 |
| Properties | | | | | | | |
| Tensile Modulus (GPa) | 10.8 | 13.2 | 11.5 | 11.5 | 13.0 | 14.5 | 10.5 |
| Tensile Strength (MPa) | 104 | 110 | 100 | 87.5 | 98.2 | 88.1 | 108 |
| Elongation at Break (%) | 2.4 | 2.1 | 2.2 | 2.1 | 2.0 | 1.8 | 2.5 |
| Impact Strength (KJ/m$^2$) | 34.5 | 34.2 | 26.2 | 23.8 | 28.2 | 24.8 | 36.5 |
| HDT at 1.8 MPa | 192 | 200 | 193 | 191 | 192 | 194 | 202 |
| UL-94 Flame at 0.8 mm | V0 | V0 | V0 | V0 | V0 | V1 | V0 |
| MVR at 265° C. and 5 Kg Load (cc/10 min) | 29.8 | 23.7 | 58.4 | 51.8 | 50.2 | 43.7 | 23.3 |

As can be seen from the above data, Ex 6 and 7 have a desirable set of properties, with V0 performance at 0.8 mm thickness, tensile strength more than 100 MPa, initial Unnotched Impact strength around 30-35 KJ/m² and a HDT around 190-200° C., which make these two compositions much useful for the applications in electrical and electronics as connectors, MCCB, fuses etc. It is evident from the CEx H that the removal of polyetherimide from the composition leads to inferior impact properties, which are critical for the applications discussed. Also the use of MC as a synergist in place of MPP leads to inferior mechanical properties as shown in CEx I. Comparing the properties of Ex 8 (20% AlP with 5% aromatic polyetherimide) and CEx I, it is clear that mechanical properties decrease in the absence of polyetherimide The compositions of Ex 6 and CEx K were based on regular PBT and iQ-PBT (made from PET waste) respectively. Ex 6 shows an improvement in the flow properties in comparison to CEx K. This invention therefore indicates that the use of iQ-PBT in the flame retardant composition improves the flow properties while retaining the other properties of the composition. High temperature molding properties of two examples are shown in Table 4.

TABLE 4

| | Injection Molding Temp (° C.) | | | |
|---|---|---|---|---|
| | 265 | 275 | 285 | 295 |
| Properties (Ex 6 Valox iQ, AlP/Ultem/MPP = 12.5/5/5) | | | | |
| Tensile Modulus (GPa) | 10.8 | 11.2 | 11.2 | 11.3 |
| Tensile Strength (MPa) | 103 | 105 | 98 | 88 |
| Elongation at break (%) | 2.4 | 2.4 | 2.0 | 1.8 |
| IUI (KJ/m²) | 34.5 | 34.1 | 29.1 | 15.2 |
| Mn | 22345 | 21815 | 19236 | 16295 |
| Mw | 58582 | 58058 | 48956 | 40043 |
| PDI | 2.6 | 2.7 | 2.6 | 2.5 |
| Properties (CEx K Valox Regular, AlP/Ultem/MPP = 12.5/5/5) | | | | |
| Tensile Modulus (GPa) | 10.5 | 11.1 | 11.1 | 11.1 |
| Tensile Strength (MPa) | 108 | 108 | 108 | 90 |
| Elongation at break (%) | 2.5 | 2.4 | 2.3 | 1.8 |
| IUI (KJ/m²) | 36.5 | 36.1 | 32.8 | 19.3 |
| Mn (number average) | 22030 | 19187 | 18467 | 17187 |
| Mw (weight average) | 60652 | 50711 | 48170 | 44040 |
| PDI | 2.7 | 2.6 | 2.6 | 2.6 |

As can be seen from the data in Table 4, the tensile strength and impact strength are retained up to a molding temperature up to 285° C. This observation indicates that the composition of the invention is a robust composition, which is able to withstand adverse conditions of processing. However, the value of molecular weight decreases with increasing molding temperature. At 285° C., it reaches the critical weight average molecular weight range of around 48,000-50,000 a.m.u., below which sharp loss in mechanical properties are observed.

Examples 7-16

The purpose of these examples was to evaluate the effect of different quenchers to control odor during processing. Categories of material used include buffers ($BPO_4$, $ZnPO_4$, $ZnBO_4$); oxides (MgO, ZnO) reactive additives (epoxides); and silicon-containing compounds (siloxanes, silanes etc.)

Techniques and Procedures

Formulations 7 to 16 below are made by dry-blending of ingredients with the exception of glass fiber. The blends are subsequently compounded on a Werner-Pfleiderer 25 mm co-rotating extruder, The extruder temperature settings (upstream to downstream) were 50-140-265-260-260-260-260-260-275° C.; a vacuum of 0.45 bar was applied and the screw rotation rate was 300 RPM.

Molding of parts was performed on a 35 ton Engel injection molding machine with temperature settings of 245-255-265-265° C. (from throat to nozzle) and a mold temperature of 70° C. for the PBT-based formulations. Prior to molding the pellets were pre-dried at 120° C. for 2-4 hrs.

Test specimens were evaluated for Izod unnotched Impact (IUI) strength in accordance with ASTM D256, and results are expressed in units of J/m. UL94 testing was employed for the flame retardance testing. The tensile strength was evaluated using ASTM D368. Heat deflection temperature was measured using ASTM D648.

Materials

The components shown in Table 5 below were used in Examples 7-16.

TABLE 5

| Component | Description | Source |
|---|---|---|
| iQ PBT 195/315 | Upcycled polybutylene terephthalate | Sabic |
| OP 1240 | Aluminum phosphinate | Ticona/Clariant |
| MPP | Melamine polyphosphate | Ciba |
| MC | Melamine cyanurate | Ciba |
| ULTEM ™ | Aromatic polyetherimide | Sabic |
| Irganox 1010 | Antioxidant | Ciba |
| TSAN | Teflon encapsulated with styrene-acrylonitrile | Sabic |
| PETS | Pentaerythritol tetrastearate | |
| NEG Glass T120 | Glass fibers | Nippon |
| ZnS | Sachtolith HDS | Sachtleben |
| ZnO | Zinc Oxide | Horsehead |
| NaSt | Sodium Stearate | Baerlocher |
| HALS 770 | Bis(2,2,6,6-tetramethyl 4-piperidyl) sebacate | Ciba |
| ADR CESA | Styrene-acrylate-epoxy oligomer | Johnson |
| Fine Talc | Talcum, Mg3Si4O10(OH)2 | Internatio BV |
| MH15 | poly(methyl hydrogensiloxane) | GE |
| MgO | Magnesium oxide | Western |
| GAPS | 3-aminopropyl silane | OSI Specialties |
| ZnPO4 | Zinc phosphate | Ferro |
| BPO4 | Boron phosphate | |
| ZnBO4 | Zinc borate | Climax |

The formulation and properties of Examples 7-16 are shown in Table 6.

TABLE 6

| | 7 | 8 | 9 | 10 | 11 | 12 | 13 | 14 | 15 | 16 |
|---|---|---|---|---|---|---|---|---|---|---|
| Component | | | | | | | | | | |
| IQ PBT | 49.77 | 49.52 | 49.27 | 49.47 | 49.77 | 49.77 | 49.77 | 49.67 | 49.62 | 49.32 |
| TSAN | 0.5 | 0.5 | 0.5 | 0.5 | 0.5 | 0.5 | 0.5 | 0.5 | 0.5 | 0.5 |
| Irganox 1010 | 0.15 | 0.15 | 0.15 | 0.15 | 0.15 | 0.15 | 0.15 | 0.15 | 0.15 | 0.15 |
| PETS | 0.2 | 0.2 | 0.2 | 0.2 | 0.2 | 0.2 | 0.2 | 0.2 | 0.2 | 0.2 |
| MPP | 5 | 5 | 5 | 5 | 5 | 5 | 5 | 5 | 5 | 5 |
| OP1240 | 12.5 | 12.5 | 12.5 | 12.5 | 12.5 | 12.5 | 12.5 | 12.5 | 12.5 | 12.5 |
| Ultem 1010-1000 | 5 | 5 | 5 | 5 | 5 | 5 | 5 | 5 | 5 | 5 |
| Fiber Glass | 25 | 25 | 25 | 25 | 25 | 25 | 25 | 25 | 25 | 25 |
| ZnS | 1.88 | 1.88 | 1.88 | 1.88 | 1.88 | 1.88 | 1.88 | 1.88 | 1.88 | 1.88 |
| ZnO | | | | | | | | | 0.15 | 0.15 |
| NaSt | | 0.25 | | | | | | | | |
| HALS 770 | | | | | | | | | | |
| ADR CESA | | | 0.5 | | | | | | | |
| Fine Talc | | | | | | | | | | |
| MgO | | | | 0.3 | | | | | | |
| MH15 | | | | | | | | 0.1 | | |
| GAPS | | | | | | | | | | 0.3 |
| $ZnPO_4$ | | | | | | 0.3 | | | | |
| $BPO_4$ | | | | | | | 0.3 | | | |
| $ZnBO_4$ | | | | | | | | 0.3 | | |
| Property | | | | | | | | | | |
| Smell rating | 3 | 3 | 3 | 2 | 2 | 2 | 2 | 1 | 1 | 1 |
| Processing | Good | Good | Good | Brittle | Good | Good | Good | Good | Good | Good |

Smell Rating:-
1: No odor,
2: Poor,
3: Bad

The results in Table 6 indicate that the compositions used in Examples 7-16, which contained an additive that was selected from the group of poly(methyl hydrogensiloxane), 3-aminopropyl silane, and ZnS/ZnO mixture where ZnO is present in an amount that is less than 0.2 wt % had no odor and good processing characteristics. The results show that the other formulations, which did not have an additive that was selected from the group of poly(methyl hydrogensiloxane), 3-aminopropyl silane, and ZnS/ZnO mixture did not perform well. Example 7, for instance, which contained only ZnS (and not mixtures of ZnS and ZnO) performed badly.

Examples 17-21

The purpose of these examples was to evaluate the mechanical properties of the compositions that performed well in Examples 7-16. The compositions of Examples 14 and 15 were selected.

The compositions used in Example 17-21 were extruded in accordance to the procedures used in Examples 14 and 15. Table 7 shows formulations and results.

TABLE 7

| | 17 | 18 | 19 | 20 | 21 |
|---|---|---|---|---|---|
| Components | | | | | |
| PBT 195 IQ | 24.82 | 24.82 | 24.82 | 22.32 | 24.82 |
| PBT 315 IQ | 24.82 | 24.82 | 24.82 | 22.32 | 24.82 |
| Ultem 1010 Fine grinds | 5 | 5 | 0 | 5 | 0 |
| Siltem | 0 | 0 | 5 | 0 | 0 |
| PPS | 0 | 0 | 0 | 0 | 5 |
| GLASS | 25 | 25 | 25 | 25 | 27.5 |
| Hytrel | 0 | 0 | 0 | 3 | 0 |
| LOTADER | 0 | 0 | 0 | 2 | 0 |
| OP1240 | 12.5 | 12.5 | 12.5 | 12.5 | 12.5 |
| MPP | 5 | 5 | 5 | 5 | 2.5 |
| PETS | 0.2 | 0.2 | 0.2 | 0.2 | 0.2 |
| TSAN | 0.5 | 0.5 | 0.5 | 0.5 | 0.5 |
| Irganox 1010 | 0.15 | 0.15 | 0.15 | 0.15 | 0.15 |
| ZnS | 1.88 | 1.88 | 1.88 | 1.88 | 1.88 |
| ZnO | 0.15 | 0 | 0.15 | 0.15 | 0.15 |
| MH15 | 0 | 0.1 | 0 | 0 | 0 |

TABLE 7-continued

|  | 17 | 18 | 19 | 20 | 21 |
|---|---|---|---|---|---|
| Properties |  |  |  |  |  |
| MVR 250 C./5 kg/6 min (cm/10 minutes) | 33 | 20 | 39 | 13 | 43 |
| Heat Deflection temp, 264 psi (ASTM D648) (° C.) | 197 | 198 | 187 | 182 | 202 |
| Modulus of Elasticity (ASTM D638) (MPa) | 11400 | 13800 | 11100 | 9340 | 11800 |
| Stress at Break (ASTM D638) (MPa) | 102 | 110 | 84 | 90 | 77 |
| Elongation at Break (ASTM D638) (%) | 2 | 2 | 1.5 | 2.2 | 1.1 |
| Impact Strength 23 C., N (ASTM D256) (J/M) | 62 | 65 | 58 | 73 | 44 |
| Impact Strength, 23 C., U (ASTM D 4812) (J/M) | 522 | 530 | 431 | 663 | 211 |
| UL rating at 0.8 mm | V0 | V0 | V0 | V1 | V1 |
| Smell | OK | OK | Poor | OK | Poor |
| Process | Good | Good | Good | Good | Good |

The results show that the compositions containing the additives selected from the group consisting of poly(methyl hydrogensiloxane), 3-aminopropyl silane, and mixtures of ZnS/ZnO not only did not exhibit an unpleasant odor, but also exhibited useful performance properties. A useful, acceptable performance property was a performance rating of V0 at 0.8 mm, and a heat deflection temperature of 190 C or more.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition consisting essentially of:
   (a) from 20 to 80 wt. % of a polyester component comprising a modified polybutylene terephthalate random copolymer (1) comprising the reaction product of a depolymerized polyethylene terephthalate component selected from the group consisting of polyethylene terephthalate and polyethylene terephthalate copolymers and 1,4-butane diol and (2) that has at least one residue derived from the polyethylene terephthalate component and containing a mixture of ethylene glycol groups, diethylene glycol groups and isophthalic acid groups;
   (b) from 5 to 35wt. % of
      a flame retardant phosphinate of the formula (I)

   (I)

a flame retardant diphosphinate of the formula (II)

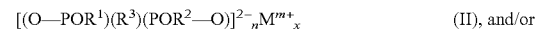   (II), and/or a flame retardant polymer derived from the flame retardant phosphinate of the formula (I) or the flame retardant diphosphinate of the formula (II),
      wherein $R^1$ and $R^2$ are identical or different and are H, $C_1$-$C_6$-alkyl, linear or branched, and/or $C_6$-$C_{10}$ aryl; $R^3$ is $C_1$-$C_{10}$, alkylene, linear or branched, $C_6$-$C_{10}$-arylene, -alkylarylene or -arylalkylene; M is an alkaline earth metal, alkali metal, Al, Ti, Zn, Fe, or boron; m is 1, 2, 3 or 4; n is 1, 2, or 3; and x is 1 or 2;
   (c) from 1 to 25 wt. % of a melamine polyphosphate, melamine cyanurate, melamine pyrophosphate, and/or melamine phosphate; and
   (d) from more than 0 to 25 wt. % of a polyetherimide;
   (e) optionally, from more than 0 to 50 wt. % of a reinforcing filler;
   (f) from 0 to 5 wt. % of a chlorinated and/or brominated organic compound; and optionally an additive component selected from the group consisting of an antioxidant, a lubricant, a thermal stabilizer, an ultraviolet light absorbing additive, a quencher, a plasticizer, an antidripping agent, a mold release agent, an antistatic agent, a dye, a pigment, a laser marking additive, a radiation stabilizer, and a combination thereof
   wherein components (a), (b), (c), (d), (e), (f), the optionally additive component, have a combined total weight of 100 wt. %;
   wherein the composition exhibits improved flow as compared to a molding composition containing polybutylene terephthalate derived from monomers instead of the modified polybutylene terephthalate random copolymer; and
   wherein a molded article comprising the composition has an unnotched Izod impact strength from 20 to 50 kJ/m², measured at 23° C. in accordance with ISO 180, and a 0.8 mm thick molded sample comprising the composition has a UL-94 flammability rating of V0.

2. The composition of claim 1, wherein the residue derived from the polyethylene terephthalate component further comprises a member selected from the group consisting of antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, alkaline earth metal salts, alkali salts, phosphorous-containing compounds and anions, sulfur-containing compounds and anions, naphthalene dicarboxylic acids, 1,3-propane diol groups, and a combination thereof.

3. The composition of claim 1, wherein the residue derived from the polyethylene terephthalate component is selected from the group consisting of a cis isomer of 1,3-cyclohexane dimethanol, a cis isomer of 1,4-cyclohexane dimethanol, a trans isomer of 1,3-cyclohexane dimethanol, a trans isomer of 1,4-cyclohexane dimethanol, and combinations thereof.

4. The composition of claim 1, wherein the residue derived from the polyethylene terephthalate component further comprises a member selected from the group consisting of a cis isomer of cyclohexane dimethanol, a trans isomer of cyclohexane dimethanol, and a combination thereof.

5. The composition of claim 4, wherein the ethylene glycol groups, diethylene glycol groups, and cyclohexane dimethanol groups are present in an amount ranging individually or in combination from 0.1 to 10 mole %, based on 100 mole % of glycol in the molding composition.

6. The composition of claim 1, wherein the at least one residue derived from the polyethylene terephthalate component further comprises a cobalt-containing compound.

7. The composition of claim 1, wherein the isophthalic acid groups are present in an amount ranging from 0.07 to 10 mole %, based on 100 mole % of acid in the molding composition.

8. The composition of claim 1, wherein the polyester component further comprises a polyester selected from the group consisting of poly(ethylene terephthalate), poly(1,4-butylene terephthalate), poly(ethylene naphthalate), poly(1,4-butylene naphthalate), (polytrimethylene terephthalate), poly(1,4-cyclohexylenedimethylene 1,4-cyclohexanedicarboxylate), poly(1,4-cyclohexylenedimethylene terephthalate), poly(1,4-butylene-co-1,4-but-2-ene diol terephthalate), poly(cyclohexylenedimethylene-co-ethylene terephthalate), and a combination thereof.

9. The composition of claim 1, wherein the polyester component further comprises virgin poly(1,4-butylene terephthalate).

10. The composition of claim 1, wherein the modified poly(butylene terephthalate) copolymer has a weight average molecular weight of 45,000 a.m.u. or greater, as determined by gel permeation chromatography with a polystyrene standard.

11. The composition of claim 1, wherein M is selected from the group consisting of magnesium, calcium, aluminum, zinc, and a combination thereof.

12. The composition of claim 1, wherein M is aluminum.

13. The composition of claim 1, wherein the flame retardant phosphinate of the formula (I) or of the formula (II) is an aluminum phosphinate.

14. The composition of claim 1, wherein polyetherimide is an aromatic polyetherimide.

15. The composition of claim 1, wherein the reinforcing filler is present in the composition in an amount from greater than 0 to 50 wt. % of the composition.

16. The composition of claim 15, wherein the reinforcing filler is selected from the group consisting of particulate fillers, glass fibers, and a combination thereof.

17. The composition of claim 1, wherein the reinforcing filler is present in the composition in an amount from 10 to 30 wt. % of the composition.

18. The composition of claim 17, wherein the reinforcing filler is selected from the group consisting of particulate fillers, glass fibers, and a combination thereof.

19. The composition of claim 1, wherein the reinforcing filler is present in the composition in an amount from 30 to 50 wt. % of the composition.

20. The composition of claim 19, wherein the reinforcing filler is selected from the group consisting of particulate fillers, glass fibers, and a combination thereof.

21. The composition of claim 19, wherein the composition has a $CO_2$ reduction index that is at least 0.06 kg.

22. The composition of claim 1, wherein the chlorinated and/or brominated organic compound is present in the composition in an amount from more than 0 to less than 5 wt. % of the composition.

23. The composition of claim 1, wherein the chlorinated and/or brominated organic compound is present in the composition in an amount from 0 to less than 3 wt. % of the composition.

24. The composition of claim 1, wherein the chlorinated and/or brominated organic compound is present in the composition in an amount of less than 2000 ppm of composition.

25. The composition of claim 1, wherein a molded article comprising the composition has a tensile strength at yield from to 90 to 120 MPa, measured in accordance with ISO 527.

26. The composition of claim 1, wherein a molded article comprising the composition has a heat deflection temperature of from 175 to 225° C., measured in accordance with ISO 75 at 1.8 MPa.

27. The composition of claim 1, wherein a 0.4 mm thick molded sample comprising the composition has a UL-94 flammability rating of V0.

28. The composition of claim 1, wherein a molded article comprising the composition has a tensile modulus of elasticity from 8.0 to 10.0 GPa, measured in accordance with ISO 527.

29. The composition of claim 1, wherein a molded article comprising the composition has an elongation at break from 1 to 3%, measured in accordance with ISO 527.

30. The composition of claim 1, wherein a molded article comprising the composition has a tensile strength at yield from to 90 to 120 MPa, measured in accordance with ISO 527.

31. The composition of claim 1, wherein the composition maintains at least 80% of its initial weight average molecular weight after molding at 265° C., 275° C., or 285° C.

32. The composition of claim 1, wherein composition has a polydispersity index after molding at 265° C., 275° C., or 285° C. that is from 80% to 120% of the polydispersity index of the composition prior to molding.

33. The composition of claim 1, wherein the composition further consisting essentially of at least 3 wt. % zinc sulfide and at least 0.05 wt. % zinc oxide based on the total weight of the composition.

34. The composition of claim 33, wherein the zinc sulphide is present in an amount ranging from 3 to 14 wt. %, based on the total weight of the composition.

35. The composition of claim 33, wherein the zinc oxide is present in an amount ranging from 0.05 to 14 wt. %, based on the total weight of the composition.

36. The composition of claim 1, wherein the modified polybutylene terephthalate random copolymer is derived from a 1,4-butane diol that is derived from biomass.

37. A method for the manufacture of a composition, comprising blending the components of the composition of claim 1.

38. The method of claim 37, wherein the method further comprises adding at least 3 wt. % of zinc sulfide and at least 0.05 wt. % of zinc oxide based on the total weight of the composition, in sufficient amounts to inhibit formation of hydrogen sulfide.

39. The method of claim 38, wherein the zinc sulphide is present in an amount ranging from 3 to 14 wt. %, based on the total weight of the composition.

40. The method of claim 38, wherein the zinc oxide is present in an amount ranging from 0.05 to 14 wt. %, based on the total weight of the composition.

41. An article comprising the composition of claim 1.

42. The article of claim 41, wherein the article is an injection molded article.

43. A method of forming an article, comprising shaping, extruding, calendaring, or molding the composition of claim 1 to form the article.

44. The composition of claim 1, wherein the quencher is selected from the group consisting of poly(methyl hydrogensiloxane), 3-aminopropyl trialkoxysilane, mixtures of ZnS and ZnO, and combinations thereof in an odor-inhibiting amount that is sufficient to form a composition having a heat deflection temperature that is equal to or greater than 190° C. and an unnotched Izod impact strength from to 25 to 50 kJ/m² measured at 23° C. in accordance with ISO 180, and a 0.8 mm thick molded sample comprising the composition has a UL-94 flammability rating of V0.

45. The composition of claim 44, wherein the poly(methyl hydrogensiloxane) and/or the 3-aminopropyl trialkoxysilane are present in an amount from 0.1 to 1 wt. % of the total composition.

46. A composition consisting essentially of, based on the total weight of the composition:
from 35 to 65 wt. % of a modified polybutylene terephthalate random copolymer that (1) is derived from polyethylene terephthalate component selected from the group consisting of polyethylene terephthalate and polyethylene terephthalate copolymers and (2) that has at least one residue derived from the polyethylene terephthalate component;
from 5 to 25 wt. % of
a flame retardant phosphinate of the formula (Ia)

    (Ia), a flame retardant diphosphinate of the formula (IIa)

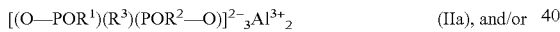    (IIa), and/or a flame retardant polymer derived from formula (I) or (II),
wherein R¹ and R² are identical or different and are H, $C_1$-$C_6$-alkyl, linear or branched, and/or aryl; R³ is $C_1$-$C_{10}$, alkylene, linear or branched, $C_6$-$C_{10}$-arylene, -alkylarylene or -arylalkylene;
from 1 to 25 wt. % of melamine polyphosphate and/or melamine cyanurate;
from 0.1 to 25 wt. % of an aromatic polyetherimide;
from 15 to 45 wt. % of a reinforcing filler; and
from 0 to 3 wt. % of a chlorinated and/or brominated organic flame retardant compound,
wherein the at least one residue derived from the polyethylene terephthalate component includes a mixture of ethylene glycol groups, diethylene glycol groups, and isophthalic acid groups; and
wherein a molded sample comprising the composition has a tensile strength at yield from 90 to 120 MPa measured in accordance with ISO 527, and an unnotched Izod impact strength from to 25 to 50 kJ/m² measured at 23° C. in accordance with ISO 180, and a 0.8 mm thick molded sample comprising the composition has a UL-94 flammability rating of V0.

47. The composition of claim 46, wherein the chlorinated and/or brominated organic flame retardant compound is present in an amount of less than 500 ppm of the composition.

48. The composition of claim 46, wherein the chlorinated and/or brominated organic flame retardant compound is present in an amount of less than 100 ppm of the composition.

49. A composition consisting essentially of, based on the total weight of the composition:
from 40 to 65 wt. % of a modified polybutylene terephthalate random copolymer that (1) is derived from polyethylene terephthalate component selected from the group consisting of polyethylene terephthalate and polyethylene terephthalate copolymers, (2) that has at least one residue derived from the polyethylene terephthalate component, and (3) that has a weight average molecular weight of 45,000 a.m.u. or greater, as determined by gel permeation chromatography with a polystyrene standard;
from 7 to 20 wt. % of
a flame retardant phosphinate of the formula (Ia)

    (Ia), a flame retardant diphosphinate of the formula (IIa)

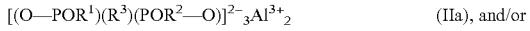    (IIa), and/or a flame retardant polymer comprising formula (Ia) or (IIa),
wherein R¹ and R² are identical or different and are H, $C_1$-$C_6$-alkyl, linear or branched, and/or aryl; R³ is $C_1$-$C_{10}$, alkylene, linear or branched, $C_6$-$C_{10}$-arylene, -alkylarylene or -arylalkylene;
from 2 to 8 wt. % of melamine polyphosphate and/or melamine cyanurate;
from 2 to 8 wt. % of an aromatic polyetherimide; and
from 20 to 35 wt. % of a reinforcing filler;
wherein the at least one residue derived from the polyethylene terephthalate component comprises a mixture of ethylene glycol groups and diethylene glycol groups.

50. A composition comprising:
(a) from 20 to 80 wt. % of a polyester component comprising a modified polybutylene terephthalate random copolymer that (1) is derived from polyethylene terephthalate component selected from the group consisting of polyethylene terephthalate and polyethylene terephthalate copolymers and (2) that has at least one residue derived from the polyethylene terephthalate component containing mixtures of ethylene glycol groups, diethylene glycol groups, and isophthalic acid groups;
(b) from 5 to 35 wt. % of
a flame retardant phosphinate of the formula (I)

    (I)

a flame retardant diphosphinate of the formula (II)

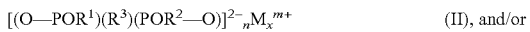    (II), and/or a flame retardant polymer derived from the flame retardant phosphinate of the formula (I) or the flame retardant diphosphinate of the formula (II),
wherein R¹ and R² are identical or different and are H, $C_1$-$C_6$-alkyl, linear or branched, and/or aryl; R³ is $C_1$-$C_{10}$, alkylene, linear or branched, $C_6$-$C_{10}$-arylene, -alkylarylene or -arylalkylene; M is an alkaline earth metal, alkali metal, Al, Ti, Zn, Fe, boron; m is 1, 2, 3 or 4; n is 1, 2, or 3; and x is 1 or 2;
(c) from 1 to 25 wt. % of a melamine polyphosphate, melamine cyanurate, melamine pyrophosphate, and/or melamine phosphate; and
(d) from more than 0 to 25 wt. % of a polyetherimide;
(e) a quencher component selected from the group consisting of from 0.1 to 1 wt % of poly(methyl hydrogensiloxane), from 0.1 to 1 wt % 3-aminopropyl trialkoxysilane, mixtures of ZnS and ZnO, wherein the ZnO is less than 50% of the mixture, and combinations thereof; and optionally an additive component selected from the group consisting of an antioxidant, a lubricant, a thermal stabilizer, an ultraviolet light absorbing additive, a plasticizer, an antidripping agent, a mold release agent, an antistatic agent, a dye, a pigment, a laser marking additive, a radiation stabilizer, and a combination thereof wherein an article molded or extruded from the composition has a heat deflection temperature that is equal to or greater than 190 C and an unnotched Izod impact strength from to 25 to 50 kJ/m$^2$ measured at 23° C. in accordance with ISO 180, and a 0.8 mm thick molded sample comprising the composition has a UL-94 flammability rating of V0;

wherein components (a), (b), (c), (d), (e) and the optionally additive component have a combined total weight of 100 wt. %.

* * * * *